United States Patent
Nam et al.

(10) Patent No.: US 9,836,861 B2
(45) Date of Patent: Dec. 5, 2017

(54) TOMOGRAPHY APPARATUS AND METHOD OF RECONSTRUCTING TOMOGRAPHY IMAGE

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Woo-hyun Nam, Seoul (KR); Jong Beom Ra, Daejeon (KR); Yongjin Chang, Incheon (KR); Yong-sup Park, Seoul (KR); Jae-sung Lee, Seoul (KR); Yunje Cho, Seoul (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 59 days.

(21) Appl. No.: 14/967,962

(22) Filed: Dec. 14, 2015

(65) Prior Publication Data
US 2016/0171726 A1 Jun. 16, 2016

Related U.S. Application Data

(60) Provisional application No. 62/090,947, filed on Dec. 12, 2014.

(30) Foreign Application Priority Data

Aug. 24, 2015 (KR) .................. 10-2015-0118881

(51) Int. Cl.
*G06K 9/00* (2006.01)
*G06T 11/00* (2006.01)

(52) U.S. Cl.
CPC ....... *G06T 11/006* (2013.01); *G06T 2211/412* (2013.01)

(58) Field of Classification Search
CPC .................. G06T 2211/412; G06T 11/006
(Continued)

(56) References Cited

U.S. PATENT DOCUMENTS 6,819,736 B1 * 11/2004 Bruder .................. A61B 6/032
378/15
7,212,602 B2 5/2007 Tsujii
(Continued)

FOREIGN PATENT DOCUMENTS

JP 3944173 B2 7/2007

OTHER PUBLICATIONS

Chen et al.; "Time-Resolved Interventional Cardiac C-arm Cone-Beam CT: An Application of the PICCS Algorithm"; IEEE Trans. Med. Imaging, Apr. 2012 31(4), pp907-923; va HHS Public Access; Jun. 5, 2012; 19 pages total.
(Continued)

*Primary Examiner* — Gregory F Cunningham
(74) *Attorney, Agent, or Firm* — Sughrue Mion, PLLC

(57) ABSTRACT

A method of reconstructing a tomography image and a tomography apparatus configured to reconstruct a tomography image are provided. Tomography data corresponding to a moving object is acquired by performing a tomography scan on the object, and a tomography image is reconstructed using prior images obtained based on the acquired tomography data.

27 Claims, 26 Drawing Sheets

(58) Field of Classification Search
USPC .......................................................... 382/131
See application file for complete search history.

(56) References Cited

U.S. PATENT DOCUMENTS

| 8,326,054 | B2 | 12/2012 | Chen et al. | |
|---|---|---|---|---|
| 9,576,391 | B2* | 2/2017 | Ra | A61B 6/503 |
| 2003/0199758 | A1* | 10/2003 | Nelson | G01N 15/1475 600/425 |

OTHER PUBLICATIONS

Reiser et al.; "Multislice CT"; Diagnostic Imaging; Springer-Verlag Berlin Heidelberg; Edition 3; 2009; 8 pages total.

Chen et al.; "Prior Image Constrained Compressed Sensing (PICCS): A Method to Accurately Reconstruct Dynamic CT Images from Highly Undersampled Projection Data Sets"; Med Phys. Via HHS Public Access; Mar. 13, 2009; Med. Phys. Feb. 2008 35(2): 660-663, 4 pages total.

Sidky et al.; "Image Reconstruction in Circular Cone-Beam Computed Tomography by Constrained, Total-Variation Minimization"; Phys. Med. Biol., Sep. 7, 2008, pp. 4777-4807; HHS Public Access on Sep. 7, 2009; 22 pages total.

Lauritsch et al.; "Towards Cardiac C-Arm Computed Tomography"; IEEE Transactions on Medical Imaging; vol. 25; No. 7; Jul. 2006; pp. 922-934; 13 pages total.

Bian et al.; "Evaluation of Sparse-view Reconstruction from Flat-panel-detector Cone-beam CT"; Phys. Med. Biol., Nov. 21, 2010, 99(22), pp. 6576-6599; via HHS Public Access; Mar. 14, 2013; 17 pages total.

Donoho; "Compressed Sensing"; Information Theory, IEEE Transactions on; vol. 52; Issue 4; Apr. 2006; pp. 1289-1306, 2 pages Abstract.

Choi et al.; "Compressed Sensing Based Cone-Beam Computed Tomography Reconstruction with a First-Order Method"; Medical Physics; vol. 37; No. 9, pp. 5113-5125; Aug. 31, 2010; 13 pages total.

Chen et al.; "Design and Development of C-arm based Cone-beam CT for Image-Guided Interventions: Initial Results"; Proceedings of SPIE—The International Society for Optical Engineering; Mar. 2006; 13 pages total.

* cited by examiner

FIRST REGIONS OF IMAGES

FIRST IMAGES RECONSTRUCTED ACCORDING TO EMBODIMENT

TOMOGRAPHY APPARATUS AND METHOD OF RECONSTRUCTING TOMOGRAPHY IMAGE

CROSS-REFERENCE TO RELATED APPLICATIONS

This application claims the benefit of U.S. Provisional Application No. 62/090,947, filed on Dec. 12, 2014, in the US Patent Office, and priority to Korean Patent Application No. 10-2015-0118881, filed on Aug. 24, 2015, in the Korean Intellectual Property Office, the disclosures of which are incorporated herein in their entireties by reference.

BACKGROUND

1. Field

Apparatuses and method consistent with the present disclosure relate to tomography apparatuses and methods of reconstructing a tomography image, and more particularly, to tomography apparatuses for reconstructing a tomography image by performing tomography scanning on a moving object and a method of reconstructing a tomography image.

2. Description of the Related Art

Medical imaging apparatuses are used to acquire images showing an internal structure of an object. The medical imaging apparatuses are non-invasive examination apparatuses that image details of structures, tissue, fluid flow, etc., inside a body and provide the images to a user. A user, e.g., a medical practitioner, may use medical images output from the medical imaging apparatuses to diagnose a patient's condition and diseases.

A computed tomography (CT) apparatus is a representative example of an apparatus for imaging an object by emitting X-rays toward a patient.

Among medical image processing apparatuses, a CT apparatus that is a tomography apparatus is capable of providing a cross-sectional image of an object. Furthermore, the CT apparatus may represent an internal structure (e.g., organs such as a kidney, a lung, etc.) of the object without superimposition of adjacent structures, as compared to a general X-ray apparatus. Due to these advantages, a CT apparatus is widely used for precise diagnosis of diseases. A medical image acquired by a tomography apparatus is hereinafter referred to as a tomography image.

A tomography apparatus performs tomography scanning on an object to acquire tomography data. The tomography data may be raw data, and the acquired raw data is used to reconstruct a tomography image. The raw data may be projection data obtained by projecting an X-ray onto the object, or may be sinogram data including a set of projection data.

For example, to obtain a tomography image, image reconstruction may be performed using sinogram data obtained by performing tomography scanning. Tomography image reconstruction will now be described in detail with reference to FIGS. 1A and 1B.

FIGS. 1A and 1B are diagrams for explaining imaging of a CT image.

In detail, FIG. 1A is a diagram for explaining a CT scan performed by a CT apparatus. During the CT scan, the CT apparatus acquires raw data while rotating around an object 25. FIG. 1B is a diagram for explaining sinogram data acquired during a CT scan and a CT image reconstructed from the sinogram data.

A CT apparatus generates and emits, via an X-ray generator, an X-ray towards an object, and detects, via an X-ray detector (not shown), the X-ray that has passed through the object. The X-ray detector may generate raw data corresponding to the detected X-ray.

In detail, referring to FIG. 1A, an X-ray generator 20 in a CT apparatus emits an X-ray towards the object 25. During a CT scan performed by the CT apparatus, as the X-ray generator 20 rotates around the object 25, and the X-ray generator 20 acquires a plurality of raw data sets 30, 31, and 32 corresponding to angles of rotation of the X-ray generator 20. In detail, the X-ray generator 20 acquires the plurality of the raw data sets 30, 31, and 32 by detecting X-rays emitted toward the object 25 at positions P1 through P3, respectively. In this case, a raw data set may be a projection data set.

To produce a cross-sectional CT image, the X-ray generator 20 may rotate 180 degrees, or more than 180 degrees.

Referring to FIG. 1B, sinogram data 40 may be acquired from the combination of the plurality of the raw data sets 30, 31, and 32 acquired by the X-ray generator 20 moving as described with reference to FIG. 1A. The sinogram data 40 is acquired by performing a CT scan in which the X-ray generator 20 rotates in one period. The sinogram data 40 corresponding to the one period may be used to produce a cross-sectional CT image. The one period may be a time period for the X-ray generator 20 to rotate 180 degrees or 360 degrees depending on specifications for a CT system.

A CT image 50 is reconstructed by performing filtered back-projection (FBP) on the sinogram data 40.

In general, it takes about 0.2 seconds for the X-ray generator 20 to rotate 180 degrees.

An object to be scanned may move during the one period of rotation. Due to the motion of the object, motion artifacts occur in a CT image.

FIG. 2 is a diagram for explaining motion artifacts present in a reconstructed CT image 200. In detail, FIG. 2 shows a CT image 200 obtained using a full reconstruction method in which an X-ray generator rotates around an object by an angle that is greater than or equal to 360 degrees.

Referring to FIG. 2, when motion artifacts occur in the reconstructed CT image 200, an outermost edge 220 of an object 210 may be unclear and overlapping with itself or others, and an inner edge 230 of the object 210 may be blurred due to movement of the object 210 in the CT image 200.

These motion artifacts in a CT image may reduce the quality of the CT image, and accordingly, analysis of an image and diagnosis of a disease by a user, e.g., a medical practitioner, may get harder.

In particular, if an object is a heart that contracts and relaxes quickly, there is a high probability of blurring or motion artifacts occurring in a CT image of the heart. Thus, blurring or motion artifacts need to be reduced in the CT image.

The degradation in quality of an image due to blurring or motion artifacts as described above becomes more severe when a C-arm CT is used. Recently, for treatment of vascular diseases such as stenosis, expansion, and occlusion, an interventional procedure under local anesthesia is favored compared to a surgical treatment. Thus, blurring or motion artifacts need to be reduced in a CT image generated by the C-arm CT

SUMMARY

Provided are tomography apparatuses and methods of reconstructing a tomography image, which are capable of reducing motion artifacts that may occur in a reconstructed tomography image.

Additional aspects will be set forth in part in the description which follows and, in part, will be apparent from the description, or may be learned by practice of the presented exemplary embodiments.

According to an aspect of an exemplary embodiment, a method of reconstructing a tomography apparatus includes: acquiring tomography data with respect to a moving object by performing a tomography scan on the object; reconstructing, based on the tomography data, a plurality of prior images respectively corresponding to a plurality of time points; generating first data by projecting a first region in each of the plurality of prior images; reconstructing a first image based on the tomography data and the first data; generating second data by projecting a second region in the first image; and reconstructing, based on the tomography data and the second data, a plurality of second images respectively corresponding to the plurality of time points.

The first region may be a region where an amount of motion of the object in each of the plurality of prior images is greater than a certain range.

The first image may be reconstructed using subtraction between the tomography data and the first data.

The second region may be a region where an amount of motion of the object in the first image is less than a certain range.

The plurality of second images may be reconstructed using subtraction between the tomography data and the second data.

Motion artifacts caused by motion of the object may be reduced in the plurality of second images, as compared to those in the plurality of prior images.

The method may further include reconstructing at least one final image based on the first image and the plurality of second images.

The method may further include: determining whether the plurality of second images satisfy a predetermined condition; generating, when the plurality of second images satisfy the predetermined condition, third data by projecting the first region in each of the plurality of second images; reconstructing a third image based on the tomography data and the third data; generating fourth data by projecting the second region in the reconstructed third image; and reconstructing, based on the tomography data and the fourth data, a plurality of fourth images respectively corresponding to the plurality of time points.

Motion artifacts caused by motion of the object may be reduced in the plurality of fourth images, as compared to those in the plurality of second images.

The method may further include correcting at least one of the plurality of second images based on motion of the object.

The plurality of second images may be reconstructed based on a plurality of data sets that are respectively acquired at the plurality of time points based on the second data, and the correcting of the at least one of the plurality of second images may include: determining, based on a predetermined criterion, two data sets respectively corresponding to two time points from among the plurality of data sets respectively corresponding to the plurality of time points; acquiring, based on the determined two data sets, motion information; and correcting at least one of the plurality of second images based on the acquired motion information.

The correcting of the at least one of the plurality of second images may include: determining, based on a predetermined criterion, two second images respectively corresponding to two time points from among the plurality of second images respectively corresponding to the plurality of time points; acquiring motion information representing motion of the object based on the determined two second images; and correcting at least one of the plurality of second images based on the acquired motion information.

The corrected at least one of the plurality of second images may correspond to a time point between the two time points.

According to an aspect of another exemplary embodiment, a tomography apparatus includes: a data acquisition unit configured to acquire tomography data with respect to a moving object by performing a tomography scan on the object; and an image reconstruction unit configured to reconstruct, based on the tomography data, a plurality of prior images respectively corresponding to a plurality of time points, generate first data by projecting a first region in each of the plurality of prior images, reconstruct a first image based on the tomography data and the first data, generate second data by projecting a second region in the first image, and reconstruct based on the tomography data and the second data, a plurality of second images respectively corresponding to the plurality of time points.

The first region may be a region where an amount of motion of the object in each of the plurality of prior images is greater than a certain range.

The first image may be reconstructed using subtraction between the tomography data and the first data.

The second region may be a region where an amount of motion of the object in the first image is less than a certain range.

The plurality of second images may be reconstructed using subtraction between the tomography data and the second data.

Motion artifacts caused by motion of the object may be reduced in the plurality of second images, as compared to those in the plurality of prior images.

The image reconstruction unit may be further configured to reconstruct at least one final image based on the first image and the plurality of second images.

The image reconstruction unit may be further configured to determine whether the plurality of second images satisfy a predetermined condition, generate, when the plurality of second images satisfy the predetermined condition, third data by projecting the first region in each of the plurality of second images, reconstruct a third image based on the tomography data and the third data, generate fourth data by projecting the second region in the reconstructed third image, and reconstruct, based on the tomography data and the fourth data, a plurality of fourth images respectively corresponding to the plurality of time points.

Motion artifacts caused by motion of the object may be reduced in the plurality of fourth images, as compared to those in the plurality of second images.

The image reconstruction unit may be further configured to correct at least one of the plurality of second images based on motion of the object.

The plurality of second images may be reconstructed based on a plurality of data sets that are respectively acquired at the plurality of time points based on the second data, and the image reconstruction unit may be further configured to determine, based on a predetermined criterion, two data sets respectively corresponding to two time points from among the plurality of data sets respectively corresponding to the plurality of time points, acquire motion information representing motion of the object based on the determined two data sets, and correct at least one of the plurality of second images based on the acquired motion information.

The image reconstruction unit may be further configured to determine, based on a predetermined criterion, two second images respectively corresponding to two time points from among the plurality of second images respectively corresponding to the plurality of time points, acquire motion information representing motion of the object based on the determined two second images, and correct at least one of the plurality of second images based on the acquired motion information.

The corrected at least one of the plurality of second images may correspond to a time point between the two time points.

According to an aspect of another exemplary embodiment, a non-transitory computer-readable recording medium has recorded thereon a program for executing the method of reconstructing a tomography image on a computer.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
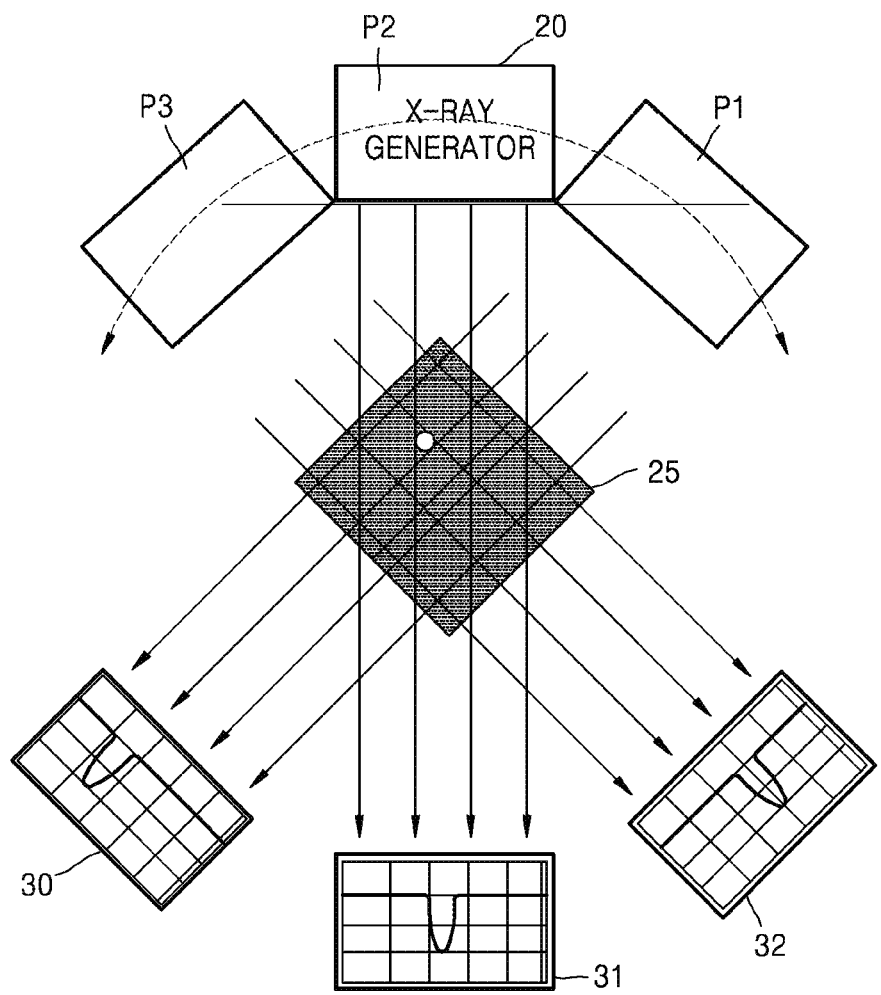
FIGS. 1A and 1B are diagrams for explaining imaging of a computed tomography (CT) image.
Figure 1B:
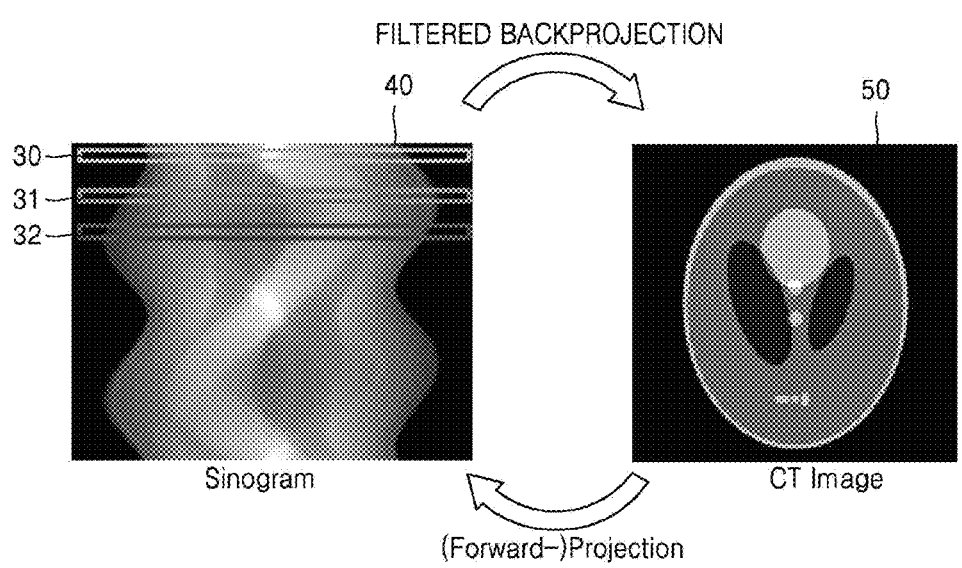
Figure 2:
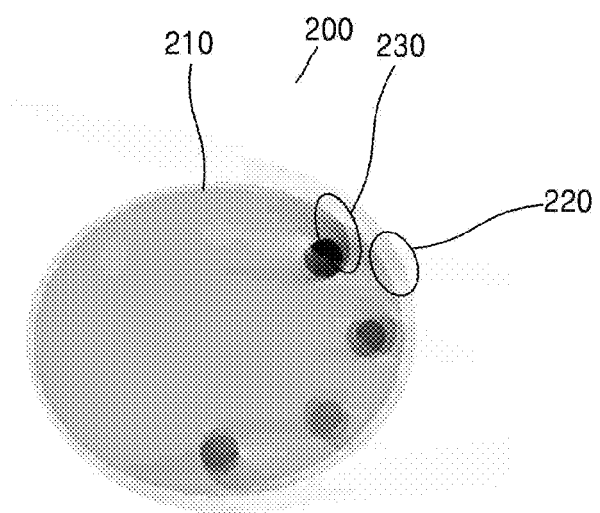
FIG. 2 is a diagram for explaining motion artifacts present in a reconstructed CT image.

Advantages and features of one or more exemplary embodiments and methods of accomplishing the same may be understood more readily by reference to the following detailed description of the exemplary embodiments and the accompanying drawings. In this regard, the exemplary embodiments may have different forms and should not be construed as being limited to the descriptions set forth herein. Rather, these exemplary embodiments are provided so that this disclosure will be thorough and complete and will fully convey the concept of the exemplary embodiments to one of ordinary skill in the art, and the exemplary embodiments will only be defined by the appended claims. Like reference numerals refer to like elements throughout the specification.

Hereinafter, the terms used in the specification will be briefly defined, and the exemplary embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the term "unit" in the exemplary embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Expressions such as "at least one of," when preceding a list of elements, modify the entire list of elements and do not modify the individual elements of the list.

Reference will now be made in detail to exemplary embodiments, examples of which are illustrated in the accompanying drawings. In this regard, the exemplary embodiments may have different forms and should not be construed as being limited to the descriptions set forth herein. In the following description, well-known functions or constructions are not described in detail so as not to obscure the exemplary embodiments with unnecessary detail.

Throughout the specification, an "image" may mean multi-dimensional data formed of discrete image elements, e.g., pixels in a two-dimensional (2D) image and voxels in a three-dimensional (3D) image. For example, the image may include a medical image of an object which is imaged by a computed tomography (CT) imaging apparatus.

Throughout the specification, a "tomography image" may mean an image obtained by performing a tomography scan on an object by using a tomography imaging apparatus, that is, an image obtained by projecting a light beam such as an X-ray toward an object and imaging by using projection data. A "CT image" may mean an image generated by synthesizing a plurality of X-ray images that are obtained by imaging an object while a CT imaging apparatus rotates around at least one axis with respect to the object.

Furthermore, in the present specification, an "object" may be a human, an animal, or a part of a human or animal. For example, the object may be an organ (e.g., the liver, heart, womb, brain, breast, or abdomen), a blood vessel, or a combination thereof. The object may be a phantom. The phantom means a material having a density, an effective atomic number, and a volume that are approximately the same as those of an organism. For example, the phantom may be a spherical phantom having properties similar to the physical body.

Throughout the specification, a "user" may be, but is not limited to, a medical expert including a medical doctor, a nurse, a medical laboratory technologist, a medial image expert, or a technician who repairs a medical apparatus.

Since a tomography system, such as CT system, is capable of providing a cross-sectional image of an object, the tomography system may express an inner structure (e.g., organs such as kidneys, lungs, etc.) of the object without an overlap therebetween, contrary to a general X-ray imaging apparatus.

In detail, a tomography system may include all tomography apparatuses such as a computed tomography (CT) apparatus, an optical coherence tomography (OCT), or a positron emission tomography (PET)-CT apparatus.

In the following description, a CT system is exemplified as the tomography system.

The CT system may obtain a plurality of pieces of image data with a thickness not more than 2 mm several tens to several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as below:

Shade surface display (SSD)—an initial 3D imaging method of displaying only voxels having a predetermined Hounsfield Units (HU) value.

Maximum intensity projection (MIP)/minimum intensity projection (MinIP)—a 3D imaging method of displaying only voxels having the greatest or smallest HU value from among voxels that construct an image.

Volume rendering (VR)—an imaging method capable of adjusting a color and transmittance of voxels that constitute an image, according to areas of interest.

Virtual endoscopy—a method that allows endoscopy observation in a 3D image that is reconstructed by using the VR method or the SSD method.

Multi-planar reformation (MPR)—a method of reconstructing an image into a different cross-sectional image. A user may reconstruct an image in any desired direction.

Editing—a method of editing adjacent voxels so as to allow a user to easily observe an area of interest in volume rendering.

Voxel of interest (VOI)—a method of displaying only a selected area in volume rendering.

A CT system 100 according to an exemplary embodiment will now be described with reference to FIG. 3. The CT system 100 may include various types of devices.

Figure 3:
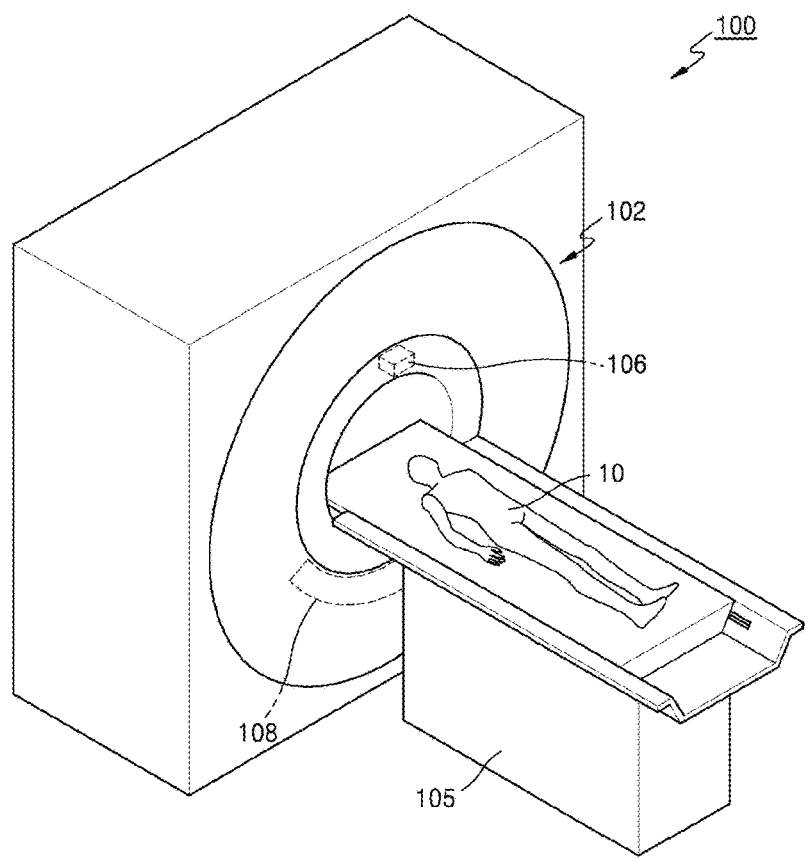
FIG. 3 is a schematic diagram of a general CT system.

FIG. 3 schematically illustrates the CT system 100. Referring to FIG. 3, the CT system 100 may include a gantry 102, a table 105, an X-ray generator 106, and an X-ray detector 108.

The gantry 102 may include the X-ray generator 106 and the X-ray detector 108.

An object 10 may be positioned on the table 105.

The table 105 may move in a certain direction (e.g., at least one of up, down, right, and left directions) during a CT imaging procedure. Also, the table 105 may tilt or rotate by a certain angle in a certain direction.

The gantry 102 may also tilt by a certain angle in a certain direction.

Figure 4:
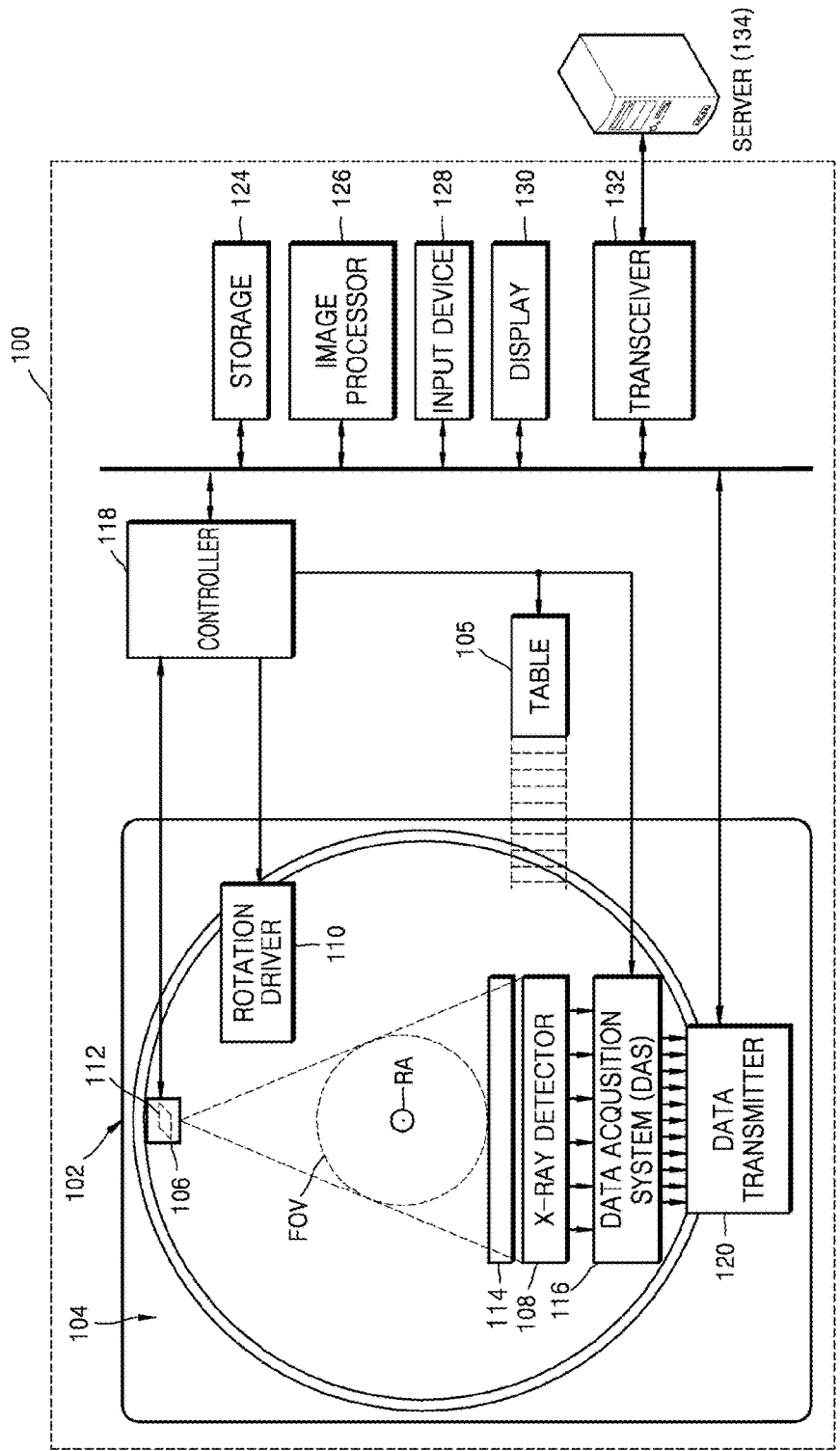
FIG. 4 shows a structure of a CT system according to an exemplary embodiment.

FIG. 4 is a block diagram illustrating a structure of the CT system 100.

The CT system 100 may include the gantry 102, the table 105, a controller 118, a storage 124, an image processor 126, an input device 128, a display 130, and a transceiver 132.

As described above, the object 10 may be positioned on the table 105. In the present exemplary embodiment, the table 105 may move in a certain direction (e.g., at least one of up, down, right, and left directions), and movement of the table 105 may be controlled by the controller 118.

The gantry 102 may include a rotating frame 104, the X-ray generator 106, the X-ray detector 108, a rotation driver 110, a data acquisition system (DAS) 116, and a data transmitter 120.

The gantry 102 may include the rotating frame 104 having a loop shape capable of rotating with respect to a certain rotation axis RA. Also, the rotating frame 104 may have a disc shape.

The rotating frame 104 may include the X-ray generator 106 and the X-ray detector 108 that are arranged to face each other so as to have predetermined fields of view FOV. The rotating frame 104 may also include an anti-scatter grid 114. The anti-scatter grid 114 may be positioned between the X-ray generator 106 and the X-ray detector 108.

Although FIG. 3 illustrates that the rotating frame 104 includes one X-ray generator 106, the rotating frame 104 may include a plurality of X-ray generators. Also, when the rotating frame 104 includes a plurality of X-ray generators, the rotating frame 104 includes a plurality of X-ray detectors corresponding to the plurality of X-ray generators. In detail, one X-ray generator 106 is one X-ray source. For example, when the rotating frame 104 includes two X-ray generators 106, it may be said that the rotating frame 104 includes a dual source. In the following description, when the rotating frame 104 includes one X-ray generator 106, the one X-ray generator 106 included in the rotating frame 104 is referred to as a single source. Also, when the rotating frame 104 includes two X-ray generators (not shown), the two X-ray generators included in the rotating frame 104 is referred to as a dual source. In the case of two X-ray generators forming a dual source, one X-ray generator is referred to as a first source and the other X-ray generator is referred to as a second source. Also, the tomography system 100 in which one X-ray generator 106 is included in the rotating frame 104 is referred to as a single source tomography apparatus, and, when two X-ray generators are included in the rotating frame 104, the tomography apparatus may be referred to as a dual source tomography apparatus.

In a medical imaging system, X-ray radiation that reaches a detector (or a photosensitive film) includes not only attenuated primary radiation that forms a valuable image but also scattered radiation that deteriorates the quality of the image. In order to transmit most of the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driver 110 and may rotate the X-ray generator 106 and the X-ray detector 108 at a certain rotation speed. The rotating frame 104 may receive the driving signal and power from the rotation driver 110 while the rotating frame 104 contacts the rotation driver 110 via a slip ring (not shown). Also, the rotating frame 104 may receive the driving signal and power from the rotation driver 110 via wireless communication.

The X-ray generator 106 may receive a voltage and current from a power distribution unit (PDU) (not shown) via a slip ring (not shown) and then a high voltage generator (not shown), and may generate and emit an X-ray. When the high voltage generator applies predetermined voltage (hereinafter, referred to as a tube voltage) to the X-ray generator 106, the X-ray generator 106 may generate X-rays having a plurality of energy spectra that correspond to the tube voltage.

The X-ray generated by the X-ray generator 106 may be emitted in a certain form due to a collimator 112.

The X-ray detector 108 may be positioned to face the X-ray generator 106. Each of the plurality of X-ray detecting devices may establish one channel, but the exemplary embodiments are not limited thereto.

The X-ray detector 108 may detect the X-ray that is generated by the X-ray generator 106 and that is transmitted through the object 10, and may generate an electrical signal corresponding to intensity of the detected X-ray.

The X-ray detector 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 may be connected to the X-ray detector 108. Electrical signals generated by the X-ray detector 108 may be acquired by the DAS 116. Electrical signals generated by the X-ray detector 108 may be acquired by wire or wirelessly by the DAS 116. Also, the electrical signals generated by the X-ray detector 108 may be provided to an analog-to-digital converter (not shown) via an amplifier (not shown).

According to a slice thickness or the number of slices, only some of a plurality of pieces of data collected by the X-ray detector 108 may be provided to the image processor 126 via the data transmitter 120, or the image processor 126 may select only some of the plurality of pieces of data.

Such a digital signal may be provided to the image processor 126 via the data transmitter 120. The digital signal may be provided to the image processor 126 by wire or wirelessly.

The controller 118 may control an operation of each of the elements in the CT system 100. For example, the controller 118 may control operations of the table 105, the rotation driver 110, the collimator 112, the DAS 116, the storage 124, the image processor 126, the input device 128, the display 130, the transceiver 132, or the like.

The image processor 126 may receive data acquired by the DAS 116 (e.g., pure data that is data before processing), via the data transmitter 120, and may perform pre-processing.

The pre-processing may include, for example, a process of correcting a sensitivity irregularity between channels and a process of correcting signal loss due to a rapid decrease in signal strength or due to the presence of an X-ray absorbing material such as metal.

Data output from the image processor 126 may be referred to as raw data or projection data. The projection data may be stored in the storage 124 with imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from all channels at the same imaging angle is referred to as a projection data set.

The storage 124 may include at least one storage medium from among a flash memory-type storage medium, a hard disk-type storage medium, a multimedia card micro-type storage medium, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The image processor 126 may reconstruct a cross-sectional image of the object 10 by using the acquired projection data set. The cross-sectional image may be a 3D image. In other words, the image processor 126 may reconstruct a 3D image of the object 10 by using a cone beam reconstruction method or the like, based on the acquired projection data set.

The input device 128 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of a FOV area, the number of slices, a slice thickness, a parameter setting with respect to image post-processing, or the like. Also, the image processing condition may include a resolution of an image, an attenuation coefficient setting for the image, setting for an image combining ratio, or the like.

The input device 128 may include a device for receiving an input from an external source. For example, the input device 128 may include a microphone, a keyboard, a mouse, a joystick, a touch pad, a touch pen, a voice recognition device, a gesture recognition device, or the like.

The display 130 may display an X-ray image reconstructed by the image processor 126.

Exchanges of data, power, or the like between the aforementioned elements may be performed by using at least one of wired communication, wireless communication, and optical communication.

The transceiver 132 may perform communication with an external device, an external medical apparatus, etc. via a server 134 or the like. Alternatively, the CT system 100 may be connected to a workstation configured to control the CT system 100 via the transceiver 132. The communication will now be described with reference to FIG. 4.

Figure 5:
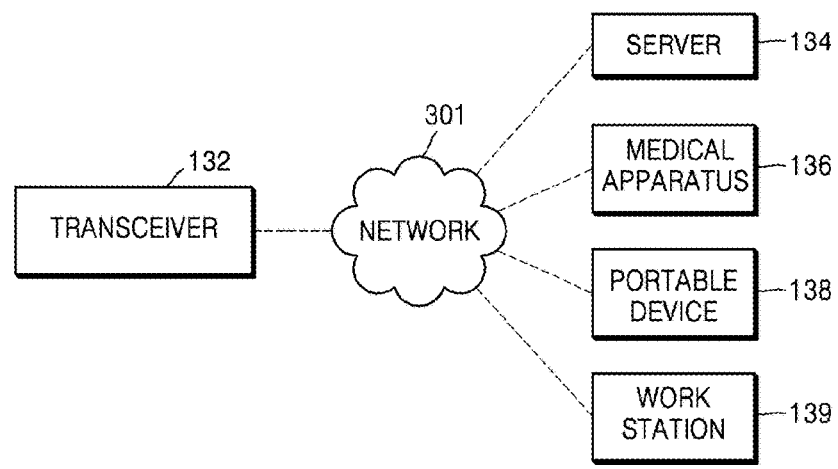
FIG. 5 is a diagram illustrating a configuration of a transceiver.

FIG. 5 is a block diagram illustrating the communication performed by the transceiver 132.

The transceiver 132 may be connected to a network 301 by wire or wirelessly and therefore may perform communication with the server 134, a medical apparatus 136, a portable device 138 or a work station 139. The transceiver 132 may exchange data with a hospital server or other medical apparatuses in a hospital connected via a picture archiving and communication system (PACS).

Also, the transceiver 132 may perform data communication with the portable device 138 or the like, according to the digital imaging and communications in medicine (DICOM) standard.

The transceiver 132 may transmit and receive data related to diagnosing the object 10, via the network 301. Also, the transceiver 132 may transmit and receive a medical image obtained from the medical apparatus 136 such as a magnetic resonance imaging (MRI) apparatus, a C-arm CT system, or the like.

Furthermore, the transceiver 132 may receive a diagnosis history or a medical treatment schedule about a patient from the server 134 and may use the diagnosis history or the medical treatment schedule to diagnose the patient. Also, the transceiver 132 may perform data communication not only with the server 134 or the medical apparatus 136 in a hospital but also with the portable device 138 or the work station 139 of a user or patient.

Also, the transceiver 132 may transmit information about a device error, information about a quality control status, or the like to a system manager or a service manager via the network 301, and may receive a feedback regarding the information from the system manager or service manager.

The work station 139 may be present in a space that is physically separated from the CT system 100. The CT system 100 and the work station 139 may be installed in a shield room and a console room, respectively. The shield room is a space where the CT system is located to image an object, and may be referred to as an 'imaging room', an 'examination room', a 'testing room', etc. Furthermore, the console room is a space where a user is located to control the CT system 100 and which is separated from the shield room. The console room and the shield room may be separated from each other by a shielding wall to protect the user from magnetic fields, radiation, radio frequency (RF) signals, etc. being transmitted from the shield room.

In addition, the CT system 100 may be a C-arm CT system as described with reference to FIG. 6.

Figure 6:
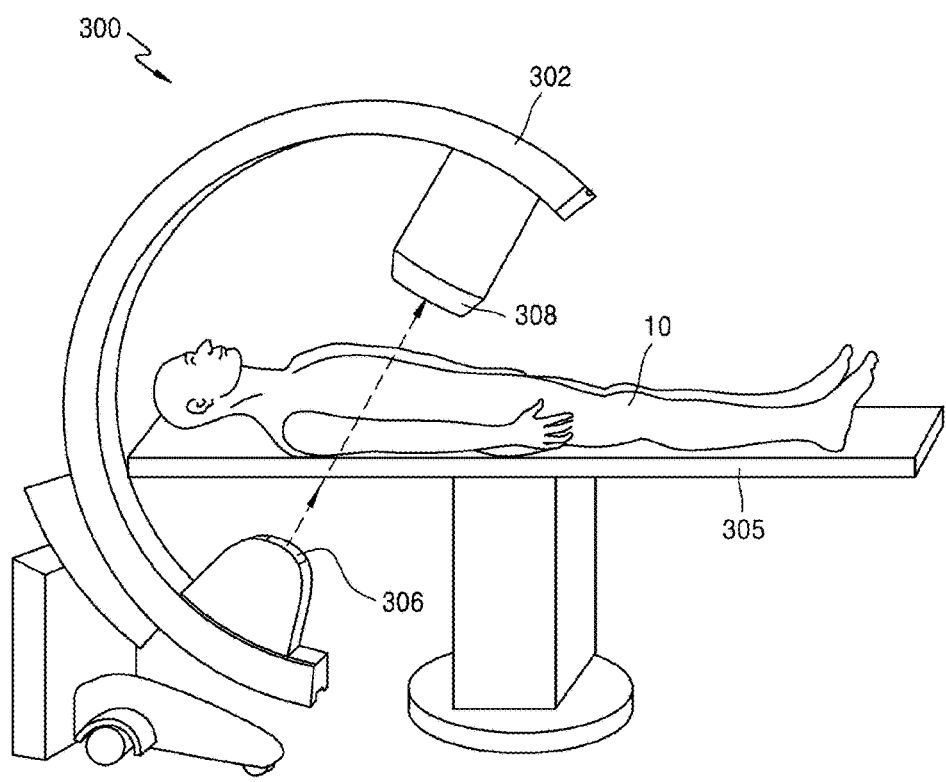
FIG. 6 is a schematic diagram of a general C-arm CT system.

FIG. 6 is a schematic diagram of a general C-arm CT system 300.

Referring to FIG. 6, the C-arm CT system 300 is equipped with a C-arm 302 having a C shape, and performs a CT scan for a certain time. The C-arm 302 has an X-ray source 306 at one end thereof and a detector 308 at the other end thereof. The C-arm 302 connects the X-ray tube 306 with the detector 308 and adjusts positions of the X-ray source 306 and the detector 308. Although not shown in FIG. 4, the C-arm 302 may be secured to either or both of a ceiling and a floor. Furthermore, the C-arm CT system 300 may further include a table 305 where an object 10 is placed.

The X-ray source 306 is configured to generate and emit X-rays. The detector 308 is configured to detect X-rays that are emitted by the X-ray source 306 and pass through the object 10. A medical image may be acquired based on the X-rays detected by the detector 308. The X-ray source 306 may emit X-rays toward the object 10 while rotating. The X-ray source 306 may rotate due to rotation of the C-arm 302, and the detector 308, also rotating together with the X-ray source 306, may detect X-rays that have passed through the object 10.

The user may image the object 10 at different positions or angles by adjusting a position of at least one of the C-arm 302 and the table 305. For example, the user may obtain a medical image by imaging the object 10 by moving or rotating at least one of the C-arm 302 and the table 305. Thus, use of the C-arm CT system 300 allows the user to more efficiently image the object 10 for a continuous period of time compared to when using a general stationary CT system.

The C-arm CT system 300 may include an interventional C-arm CT system, an interventional angiography C-arm CT system, or a surgical C-arm CT system.

Figure 7:
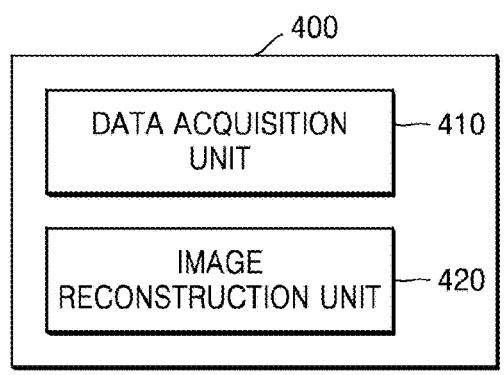
FIG. 7 is a block diagram of a tomography apparatus according to an exemplary embodiment.

FIG. 7 is a block diagram of a tomography apparatus 400 according to an exemplary embodiment.

Referring to FIG. 7, the tomography apparatus 400 according to the present exemplary embodiment includes a data acquisition unit 410 and an image reconstruction unit 420. The data acquisition unit 410 and the image reconstruction unit 420 may be embodied as a controller within the tomography apparatus 400, that includes a processor and memory which are configured to execute one or more of the functions described below.

The tomography apparatus 400 may be included in the CT system 100 of FIG. 3 or the C-arm CT system 300 of FIG. 6. Furthermore, the tomography apparatus 400 may be included in the medical apparatus 136, the portable device 138, or the work station 139 described with reference to FIG. 5 and be connected to the CT system 100 or the C-arm CT system 300 to be operated.

When the tomography apparatus 400 is included in the CT system 100 or the C-arm CT system 300, a data acquisition unit 410 and an image reconstruction unit 420 may be embodied as the image processor 126 shown in FIG. 4.

The data acquisition unit 410 performs a tomography scan on a moving object to acquire tomography data with respect to the object. The moving object may be the heart. The tomography data may be raw data, and the raw data may be projection data obtained by projecting an X-ray onto the object, or may be sinogram data including a set of a projection data.

The acquired tomography data may be raw data which is electrocardiogram (ECG)-gated.

The image reconstruction unit 420 reconstructs, based on the acquired tomography data, a plurality of prior images respectively corresponding to a plurality of time points. A prior image may be a two- or three-dimensional (2D or 3D) CT image.

The image reconstruction unit 420 may generate first data by projecting a first region in each of the reconstructed plurality of prior images, respectively.

Exemplary embodiments are not limited thereto, and a first region in each of a plurality of prior images may be determined based on various methods.

By projecting a first region in each of a plurality of prior images, first data is generated. The first data may be sinogram data corresponding to the first regions. In other words, the first data may be sinogram data estimated by forward-projecting the first regions in the plurality of prior images.

The image reconstruction unit 420 reconstructs a first image based on the acquired tomography data and the generated first data.

Tomography data may be a full set of raw data or a plurality of raw data sets respectively acquired at a plurality of time points. The tomography data and the first data may all be sinogram data.

Thus, subtraction between tomography data and first data that are all sinogram data may correspond to sinogram data with respect to the remaining regions other than the first regions in the plurality of prior images. In other words, the subtraction between the tomography data and first data may correspond to sinogram data with respect to a second region as described below.

Since sinogram data corresponding to the remaining regions other than the first regions in the plurality of prior images does not need to be gated, the first image reconstructed from the sinogram data may have reduced motion artifacts therein.

The image reconstruction unit 420 may reconstruct a first image based on subtraction between tomography data and first data.

The image reconstruction unit 420 may generate second data by projecting a second region in the reconstructed first image.

The image reconstruction unit 420 may generate second data by projecting a second region in a first image. According to an exemplary embodiment, the second region may be the remaining region other than a first region in each of the prior images. Furthermore, the second region may not overlap with the first region.

Second data is generated by projecting a second region in a first image. The second data may be sinogram data corresponding to the second region. In other words, the second data may be sinogram data estimated by forward-projecting the second region in the first image.

The image reconstruction unit 420 may reconstruct a plurality of second images respectively corresponding to a plurality of time points, based on the acquired tomography data and the generated second data.

The acquired tomography data may be a full set of raw data or a plurality of raw data sets respectively acquired at the plurality of time points. The tomography data and the second data may all be sinogram data.

Thus, subtraction between tomography data and second data that are all sinogram data may correspond to sinogram data with respect to the remaining region other than the second region in the first image. In other words, the subtraction between the tomography data and second data may correspond to sinogram data with respect to a first region.

The image reconstruction unit 420 may reconstruct a plurality of second images respectively corresponding to a plurality of time points, based on subtraction between tomography data and second data.

Reconstruction of a second image requires less time than reconstruction of the entire region in a prior image. Thus, if a plurality of images are reconstructed by projecting again the first and second regions based on the reconstructed plurality of second images, the second region in the reconstructed images may have reduced blurring or motion artifacts as compared with those in images reconstructed during preceding operations.

Figure 8:
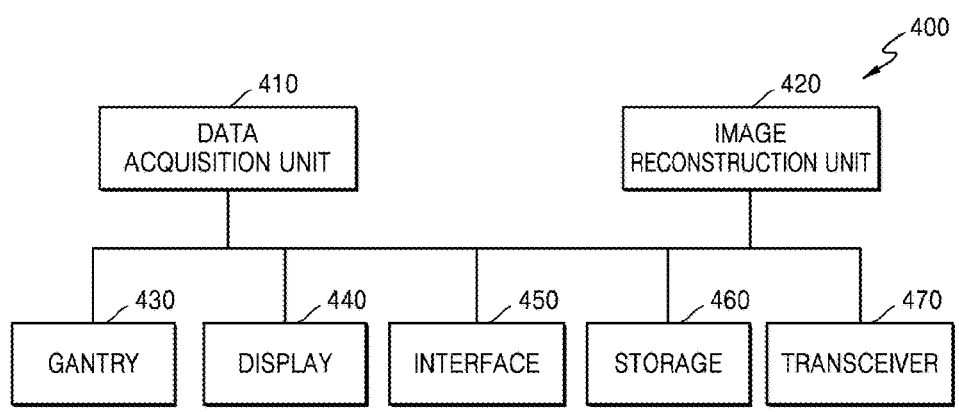
FIG. 8 is a block diagram of a tomography apparatus according to another exemplary embodiment.

FIG. 8 is a block diagram of a tomography apparatus 400 according to another exemplary embodiment.

Referring to FIG. 8, the tomography apparatus 400 may further include at least one of a gantry 430, a display 440, an interface 450, a storage 460, and a transceiver 470, as well as the data acquisition unit 410 and image reconstruction unit 420 illustrated in FIG. 7.

Since the gantry 430, the display 440, the interface 450, the storage 460, and the transceiver 470 included in the tomography apparatus 400 may have the same configurations and functions as those of their counterparts, the gantry 102, the display 130, the input device 128, the storage 124, and the transceiver 132 of the CT system 100 of FIG. 4, descriptions already provided with reference to FIG. 4 will be omitted below.

The data acquisition unit 410 performs a tomography scan on a moving object to acquire tomography data with respect to the object. The tomography data may be raw data, and the raw data may be projection data obtained by projecting an X-ray onto the object, or may be sinogram data including a set of projection data. The raw data may be acquired in the gantry 430. Furthermore, the raw data may be acquired by an external CT system (not shown) and received via the transceiver 470.

The image reconstruction unit 420 reconstructs, based on the acquired tomography data, a plurality of prior images respectively corresponding to a plurality of time points. A prior image may be a two- or three-dimensional (2D or 3D) CT image.

The image reconstruction unit 420 may generate first data by projecting first region in each of the reconstructed plurality of prior images, respectively, and reconstruct a first image based on the acquired tomography data and the generated first data. The image reconstruction unit 420 may reconstruct the first image, based on subtraction between the tomography data and the first data.

The image reconstruction unit 420 may generate second data by projecting a second region in a reconstructed first image. In this case, the image reconstruction unit 420 may generate second data by projecting a second region in the first image. The second region may be the remaining region other than a first region in each of the prior images. Furthermore, the second region may not overlap with the first region in the prior images.

The image reconstruction unit 420 may reconstruct a plurality of second images respectively corresponding to a plurality of time points, based on the acquired tomography data and the generated second data. The image reconstruction unit 420 may reconstruct a plurality of second images respectively corresponding to a plurality of time points, based on subtraction between tomography data and second data.

In detail, motion information representing the amount of motion may include a value corresponding to a motion vector field between first image and second images. The motion information may be information indicating a relationship between the amount of motion of the object and time.

The image reconstruction unit 420 may compare estimated information at a third time point and measured information at the third time point using the motion information, and may modify the motion information so as to decrease a difference between the compared information.

The display 440 displays a screen. In detail, the display 440 may display a user interface screen necessary for performing a CT scan or a reconstructed CT image.

The gantry 430 includes the X-ray generator (106 of FIG. 4), the X-ray detector (108 of FIG. 4), and the data acquisition system (DAS, 116 of FIG. 4). The gantry 430 emits an X-ray toward an object, detects the X-ray that has passed through the object, and generates raw data corresponding to the detected X-ray.

In detail, the X-ray generator 106 generates an X-ray. The X-ray generator 106 also emits the X-ray towards the object while rotating around the object. Then, the X-ray detector 108 detects the X-ray that has passed through the object. The DAS 116 generates raw data corresponding to the detected X-ray. In this case, the raw data may be projection data obtained by projecting radiation onto the object, or may be sinogram data including a set of projection data.

A method of reconstructing a cross-sectional CT image from raw data acquired, in which the X-ray generator 106 rotates by 180°, is hereinafter referred to as a half reconstruction method. A method of reconstructing a cross-sectional CT image from raw data acquired, in which the X-ray generator 106 rotates by 360°, is hereinafter referred to as a full reconstruction method. 'One period' is defined as a time period needed for the X-ray generator 106 to rotate in order to acquire raw data for reconstructing one cross-sectional CT image. In a half reconstruction method, an angle by which the X-ray generator 106 rotates for one period is greater than or equal to 180°. In a full reconstruction method, an angle by which the X-ray generator 106 rotates for one period is greater than or equal to 360°. For example, in the half reconstruction method, the angle may be 180° plus a fan angle, i.e., in a range of between about 240° (180°+60°) and about 300° (180°+120°). In the full reconstruction method, the angle may be 360° plus a fan angle, i.e., about 420° (360°+60°).

In addition, a method of reconstructing a CT image from raw data acquired in a period which is shorter than the one period described above is hereinafter referred to as a partial angle reconstruction (PAR) method.

The tomography apparatus 400 according to the exemplary embodiments may use any of a PAR method, a full reconstruction method, and a half reconstruction method.

In detail, the gantry 430 may perform a tomography scan by using at least one of a half reconstruction method, a full reconstruction method, and a PAR method, thereby raw data is acquired. The data acquisition unit 410 reconstructs first images and second images using raw data that is transmitted by the gantry 430 or an externally connected CT system.

The interface 450 creates and outputs a user interface screen for receiving a command or data from a user and receives the command or data from the user via the user interface screen. The user interface screen output from the interface 450 may also be displayed on the display 440. The user may then view the user interface screen displayed via the display 440 to recognize information and input a command or data.

For example, the interface 450 may include a mouse, a keyboard, or another input device including hard keys for inputting data. For example, the user may enter data or a command by manipulating at least one of the mouse, the keyboard, and the other input device.

The interface 450 may be a touch pad. In detail, the interface 450 may include a touch pad (not shown) combined with a display panel (not shown) in the display 440 and a user interface screen may be displayed on the display panel which is combined with the touch pad. When a command is input via the user interface screen, the touch pad may detect the input of the command to obtain the command input by the user.

In detail, when the interface 450 is a touch pad, the interface 450 detects a touched point at which the user touches on the user interface screen, and then information about the detected touched point is obtained to execute a corresponding command in the tomography apparatus 400. The tomography apparatus 400 may reconstruct a CT image according to the obtained command.

The storage 460 may store data acquired by performing a CT scan. In detail, the storage 460 may store at least one of raw data such as projection data, sinogram data, etc. Furthermore, the storage 460 may store various data, programs, etc., necessary for reconstructing a tomography image, as well as a CT image which is reconstructed finally.

Furthermore, the storage 460 may include at least one storage medium from among a flash memory-type storage medium, a hard disk-type storage medium, a multimedia card micro-type storage medium, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The transceiver 470 may perform communication with an external device (not shown), an external medical apparatus (not shown), etc. For example, the transceiver 470 may be connected to an external CT system (not shown) or tomography apparatus (not shown) by wire or wirelessly to receive first and second images or raw data necessary for reconstructing images. In this case, the data acquisition unit 410 may receive images or the raw data necessary for reconstructing images, which are transmitted via the transceiver 470, and reconstruct images based on the received raw data.

As described above, when an object such as the heart moves quickly, motion artifacts occur in a reconstructed CT image of the heart. According to an exemplary embodiment, the tomography apparatus 400 may reconstruct a tomography image in which motion artifacts are reduced, which will now be described in detail.

Figure 9:
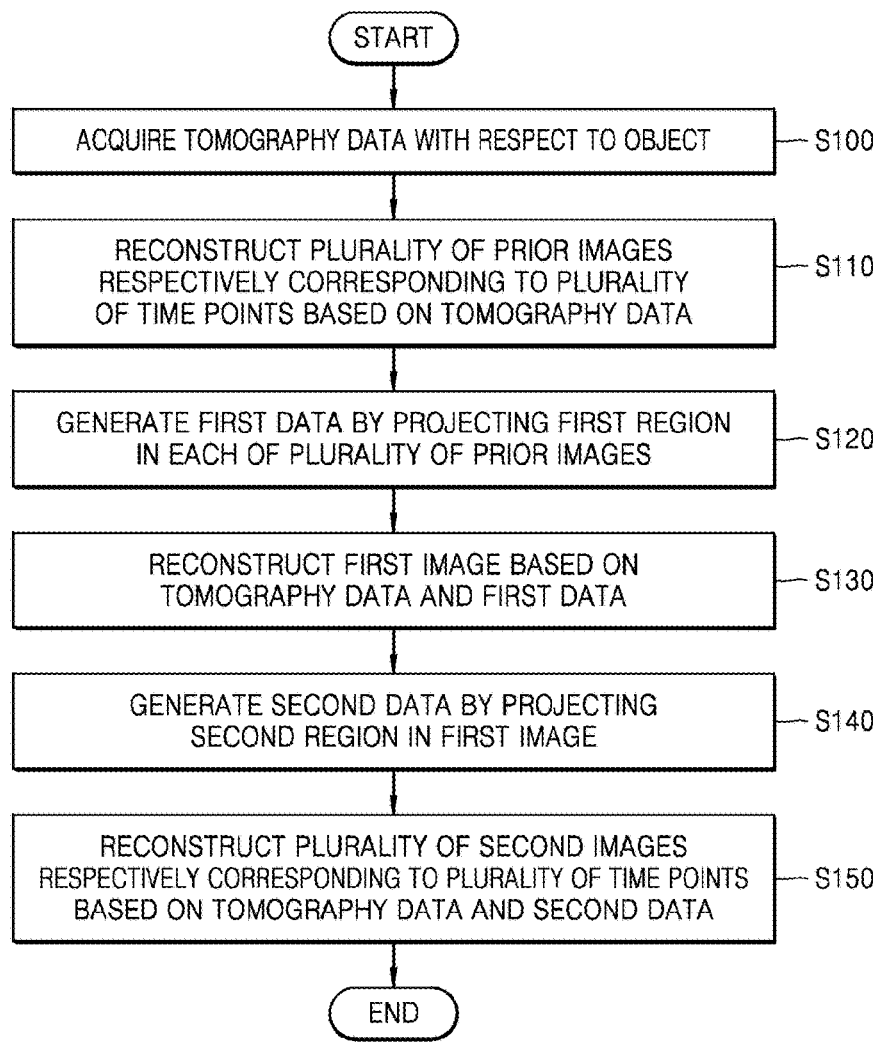
FIG. 9 is a flowchart of a method of reconstructing a tomography image, according to an exemplary embodiment.

FIG. 9 is a flowchart of a method of reconstructing a tomography image according to an exemplary embodiment.

For convenience of explanation, the method of FIG. 9 is described with reference to FIGS. 10A through 10C.

Figure 10A:
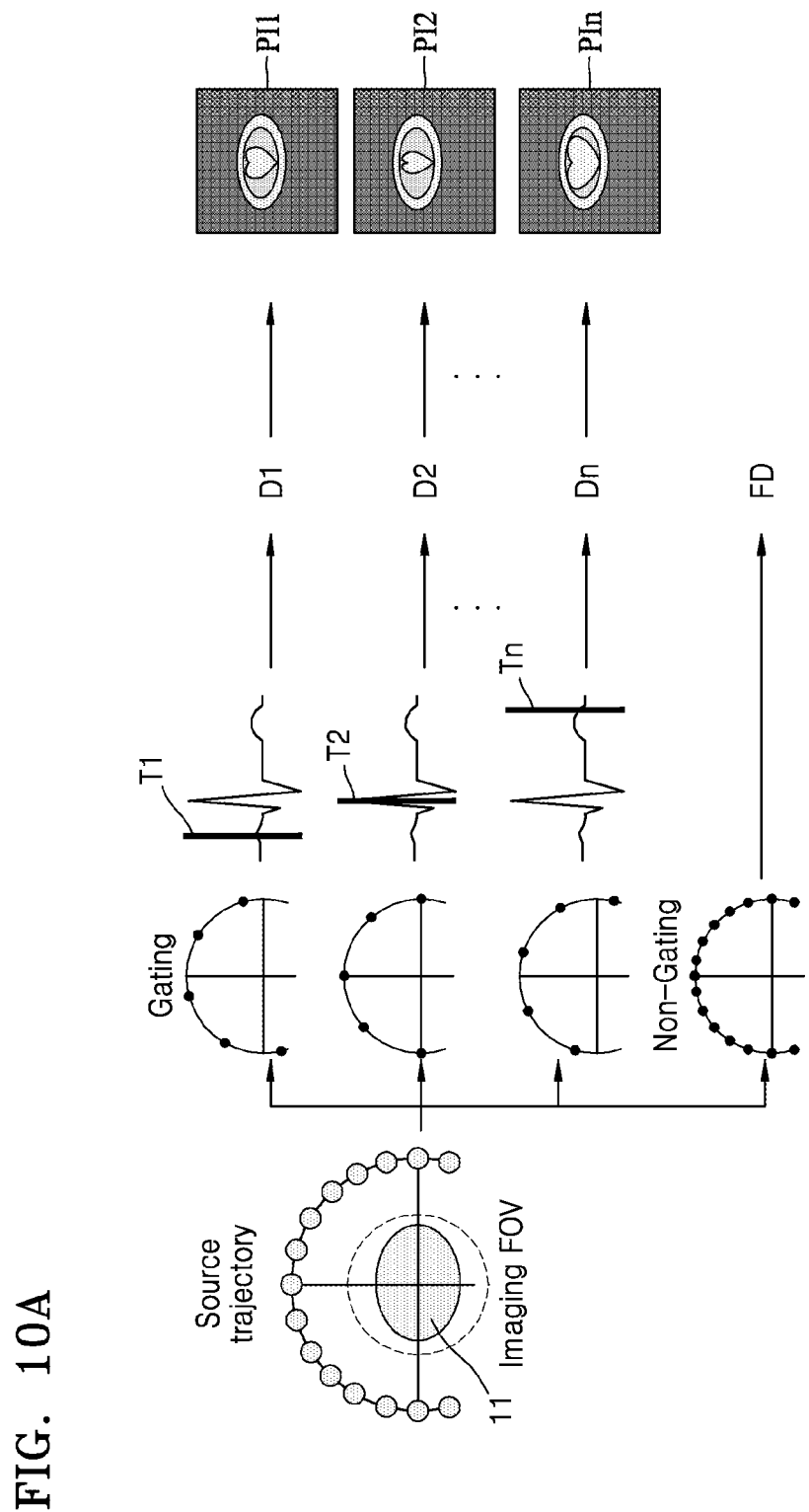
FIG. 10A is a diagram for explaining reconstruction of a plurality of prior images, according to an exemplary embodiment.

FIG. 10A is a diagram for explaining reconstruction of a plurality of prior images according to an exemplary embodiment.

Figure 10B:
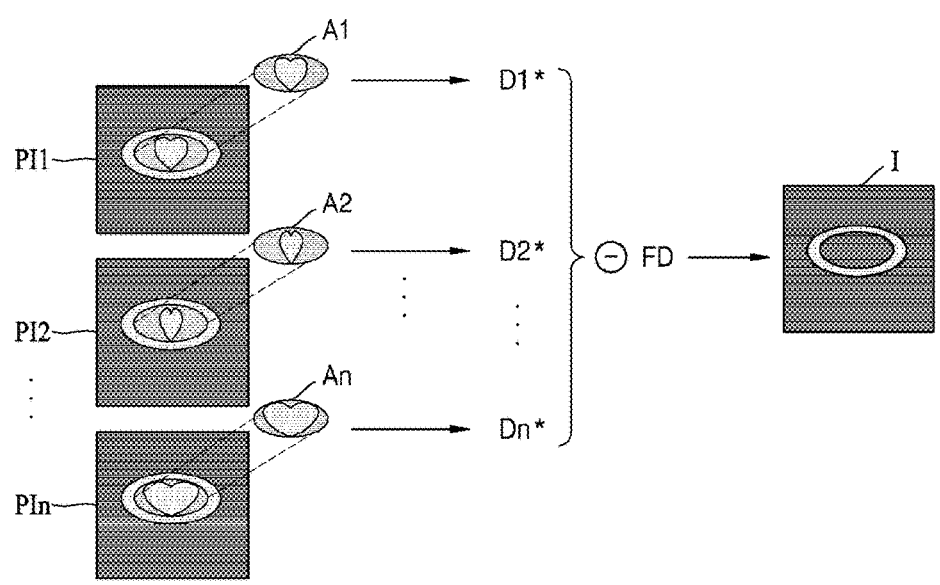
FIG. 10B is a diagram for explaining reconstruction of a first image, according to an exemplary embodiment.

FIG. 10B is a diagram for explaining reconstruction of a first image according to an exemplary embodiment.

Figure 10C:
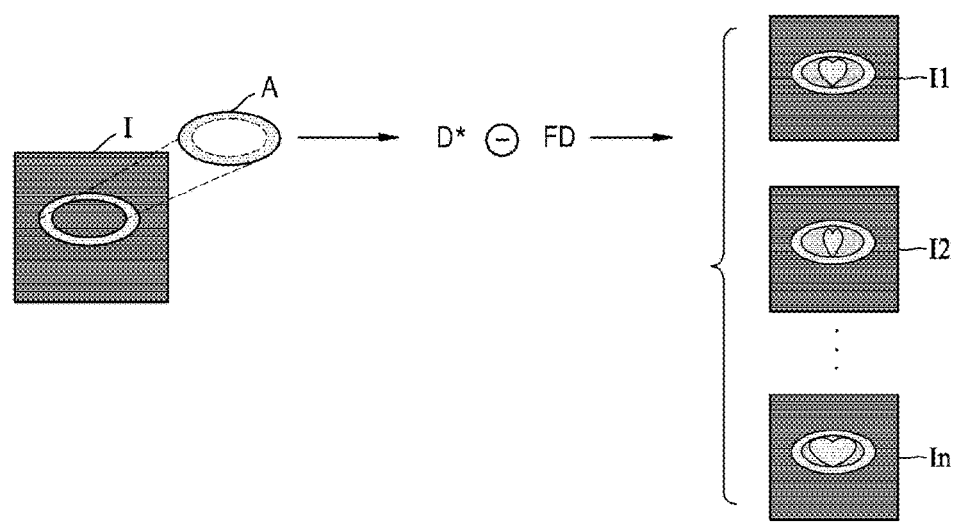
FIG. 10C is a diagram for explaining reconstruction of a plurality of second images, according to an exemplary embodiment.

FIG. 10C is a diagram for explaining reconstruction of a plurality of second images according to an exemplary embodiment.

The tomography apparatus 400 performs a tomography scan on a moving object to acquire tomography data with respect to the object (S100).

The moving object may be the heart.

The tomography data may be raw data, and the raw data may be projection data obtained by projecting an X-ray onto the object, or may be sinogram data including a set of projection data.

The tomography apparatus 400 reconstructs, based on the tomography data acquired in step S100, a plurality of prior images respectively corresponding to a plurality of time points (S110).

The acquired tomography data may be raw data which is electrocardiogram (ECG)-gated.

Referring to FIG. 10A, the tomography apparatus 400 may acquire a plurality of raw data sets D1 through Dn respectively corresponding to a plurality of time points T1 through Tn, and then reconstructs, based on the acquired raw data sets D1 through Dn, a plurality of prior images PI1 through PIn respectively corresponding to the time points T1 through Tn. Here, the raw data sets D1 through Dn may be sinogram data.

For example, for a person having a regular cardiac cycle, a prospective mode is used to regularly gate an ECG signal. In the prospective mode, a plurality of sections are automatically selected at time points T1 through Tn that are a certain distance away from R peaks in the ECG signal. Raw data sets D1 through Dn are acquired by applying X-rays to the object during the plurality of sections. Then, prior images PI1 through PIn respectively corresponding to the time points T1 through Tn may be reconstructed using the raw data sets D1 through Dn acquired during the plurality of sections.

However, for example, if a patient has arrhythmia and an irregular cardiac cycle, it is difficult to detect his or her cardiac cycle in a prospective mode. In this case, a retrospective mode is used to irregularly gate an ECG signal.

Referring to FIG. 10A, In the retrospective mode, a full set of raw data FD is acquired by emitting X-rays toward the object for the entire cardiac cycle or a certain range in the cardiac cycle of the ECG signal, and then time points T1 through Tn to be used for reconstruction of prior images PI1 through PIn are selected. In other words, in the retrospective mode, the time points T1 through Tn that will be used for image reconstruction are individually set, and the prior images PI1 through PIn respectively corresponding to the time points T1 through Tn may be reconstructed using raw data sets D1 through Dn respectively acquired at the time points T1 through Tn which are individually set.

The tomography apparatus 400 reconstructs, based on acquired tomography data, a plurality of prior images PI1 through PIn respectively corresponding to a plurality of time points T1 through Tn.

According to an exemplary embodiment, the tomography data may be a full set of raw data FD. After acquiring the full set of raw data FD, the tomography apparatus 400 may extract, from the acquired full set of raw data FD, a plurality of raw data sets D1 through Dn respectively corresponding to the time points T1 through Tn, and reconstruct, based on the extracted raw data sets D1 through Dn, a plurality of prior images PI1 through PIn.

According to an exemplary embodiment, the tomography data may be a plurality of raw data sets D1 through Dn respectively corresponding to a plurality of time points T1 through Tn. The tomography apparatus 400 may reconstruct prior images PI1 through PIn respectively corresponding to the time points T1 through Tn, based on the raw data sets D1 through Dn respectively acquired at the time points T1 through Tn.

The tomography apparatus 400 generates first data by projecting a first region in each of the plurality of prior images reconstructed in step S110 (S120).

Referring to FIG. 10B, the tomography apparatus 400 may generate a plurality of pieces of first data D1* through Dn* by respectively projecting first regions A1 through An in a reconstructed plurality of prior images PI1 through PIn. Each of the first regions A1 through An may have the same size and shape. The first regions A1 through An may include a region corresponding to a moving object in the prior images PI1 through PIn. The moving object may be the heart.

As shown in FIG. 10B, each of the first regions A1 through An may include a region corresponding to the heart that repeatedly contracts and relaxes.

According to an exemplary embodiment, the first regions A1 through An may be selected based on a user input, but closed curves having substantially the same shapes and sizes in the prior images PI1 through PIn may respectively be determined as the first regions A1 through An. In this case, a closed curve includes a region corresponding to a moving object. When the amount of motion of an object in a region is greater than a certain range, the region may be determined as the region corresponding to the moving object. The amount of motion of an object may be determined by comparing points representing the same part of the object in each tomography image with one another. Differences between positions of the compared points and directions thereof may be represented by motion vectors.

Exemplary embodiments are not limited thereto, and the first regions A1 through An in the prior images PI1 through PIn may be determined using various methods.

A plurality of pieces of first data D1* through Dn* are generated by projecting first regions A1 through An in the prior images PI1 through PIn. According to an exemplary embodiment, the pieces of first data D1* through Dn* may be sinogram data corresponding to the first regions A1 through An. In other words, the pieces of first data D1* through Dn* may be sinogram data estimated by forward projecting the first regions A1 through An in the prior images PI1 through PIn.

The tomography apparatus 400 may reconstruct a first image based on the tomography data acquired in step S100 and the first data generated in step S120 (S130).

Referring to FIGS. 10A and 10B, the tomography data may be the full set of raw data FD or the raw data sets D1 through Dn respectively acquired at the time points T1 through Tn.

The tomography data (FD or D1 through Dn) and the first data D1* through Dn* may be all sinogram data.

Thus, subtraction between the tomography data FD or D1 through Dn and the first data D1* through Dn* that are all sinogram data may correspond to sinogram data corresponding to the remaining region other than the first regions A1 through An in each of the plurality of prior images PI1 through PIn. In other words, the subtraction between the tomography data FD or D1 through Dn and the first data D1* through Dn* may correspond to sinogram data corresponding to a second region A as described below with reference to FIG. 10C.

Since sinogram data corresponding to the remaining regions other than the first regions A1 through An in the plurality of prior images PI1 through PIn does not need to be gated, a first image I reconstructed from the sinogram data may have reduced motion artifacts therein.

The tomography apparatus 400 may reconstruct the first image I based on subtraction between the tomography data FD or D1 through Dn and the first data D1* through Dn*.

As shown in FIG. 10B, the reconstructed first image I may correspond to the remaining region other than the first regions A1 through An in each of the prior images PI1 through PIn, each of the first regions including the moving object.

As described above, the first image I is reconstructed from sinogram data which corresponds to the remaining regions other than the first regions A1 through An in the prior images PI1 through PIn and is not gated. Thus, the first image I may have reduced motion artifacts as compared to the prior images PI1 through PIn.

The tomography apparatus 400 may generate second data by projecting a second region in the first image reconstructed in step S130 (S140).

Referring to FIG. 10C, the tomography apparatus 400 may generate second data D* by projecting a second region A in the first image I. In this case, the second region A may be the remaining region other than each of the first regions A1 through An in a corresponding one of the prior images PI1 through PIn. Furthermore, the second region A may not overlap with each of the first regions A1 through An.

According to an exemplary embodiment, the second region A in the first image I may be selected based on a user input, but the remaining region other than the first regions A1 through An may be selected as the second region A.

Exemplary embodiments are not limited thereto, and the second region A in the first image I may be determined using various methods.

The second data D* is generated by projecting the second region A in the first image I. In this case, the second data D* may be sinogram data corresponding to the second region A. In other words, the second data D* may be sinogram data estimated by forward projecting the second region A in the first image I.

The tomography apparatus 400 reconstructs a plurality of second images respectively corresponding to the plurality of time points, based on the tomography data acquired in step S100 and the second data generated in step S140 (S150).

In this case, the acquired tomography data may be the full set of raw data FD or the raw data sets D1 through Dn respectively acquired at the time points T1 through Tn.

The tomography data (FD or D1 through Dn) the second data D* may all be sinogram data.

Thus, subtraction between the tomography data (FD or D1 through Dn) and the second data D* that are all sinogram data may correspond to sinogram data corresponding to the remaining region other than the second region A in the first image I. In other words, the subtraction between the tomography data (FD or D1 through Dn) and the second data D* may correspond to sinogram data corresponding to the first regions A1 through An.

The tomography apparatus 400 may reconstruct, based on the subtraction between the tomography data (FD or D1 through Dn) and the second data D*, a plurality of second images I1 through In respectively corresponding to the plurality of time points T1 through Tn.

When the time points T1 through Tn for reconstructing the second images I1 through In are selected or already selected in step S100, the second images I1 through In respectively corresponding to the time points T1 through Tn may be reconstructed.

According to an exemplary embodiment, a plurality of data sets (not shown) respectively corresponding to the time points T1 through Tn may be extracted based on the subtraction between the tomography data (FD or D1 through Dn) and the second data D*, and the second images I1 through In may be reconstructed based on the extracted data sets.

Reconstruction of the second images I1 through In requires less time than reconstruction of the entire regions in prior images. When a plurality of images are reconstructed based on the reconstructed plurality of second images I1 through In by projecting again the first and second regions, the second region in the reconstructed images may have reduced blurring or motion artifacts as compared with those in images reconstructed during preceding steps.

Figure 11A:
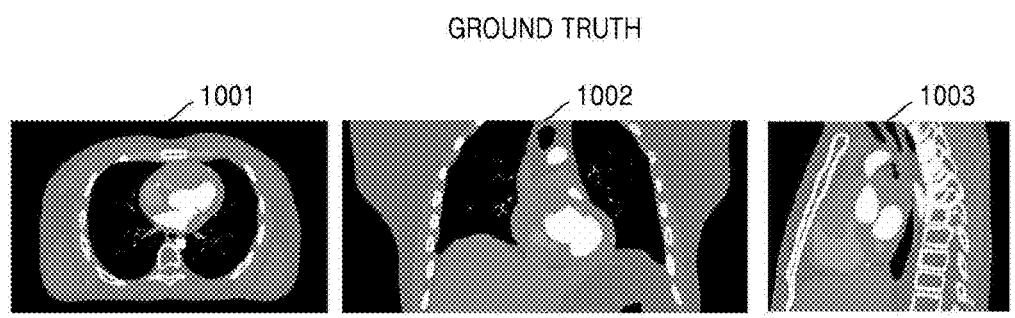
FIG. 11A shows ground-truth tomography images of a chest.

FIG. 11A shows ground-truth tomography images of a chest.

In detail, FIG. 11A illustrates ground-truth tomography images 1001, 1002, and 1003 respectively obtained in a horizontal plane, a coronal plane, and a sagittal plane of a chest.

Blurring or motion artifacts are minimized in edges or inner parts of the ground-truth tomography images 1001, 1002, and 1003.

Figure 11B:
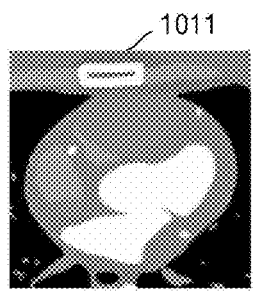
FIG. 11B illustrates first regions in the tomography images of FIG. 11A.
Figure 11B:
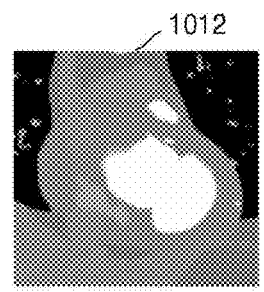
Figure 11B:
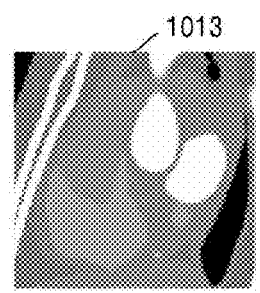

FIG. 11B illustrates enlarged images 1011, 1012, and 1013 of first regions in the ground-truth tomography images 1001, 1002, and 1003 of the chest shown in FIG. 11A.

Figure 11C:
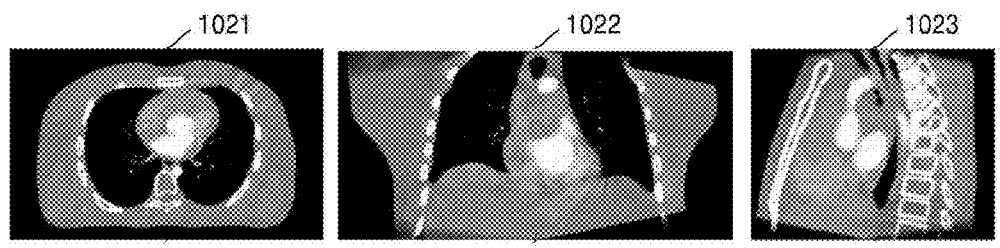
FIG. 11C shows tomography images of a chest reconstructed according to the related art.

Referring to FIG. 11B, blurring or motion artifacts due to movement of the heart contracting and relaxing are minimized in the enlarged images 1011, 1012, and 1013 of the first regions FIG. 11C shows tomography images 1021, 1022, and 1023 of a chest reconstructed according to the related art.

In detail, the tomography images 1021, 1022, and 1023 reconstructed according to the related art are respectively taken in a horizontal plane, a coronal plane, and a sagittal plane of a chest.

Referring to FIG. 11C, blurring or motion artifacts in edges or inner parts in the tomography images 1021, 1022, and 1023 of the chest reconstructed according to the related art are observed to be greater than the ground-truth tomography images 1001, 1002, and 1003 of the chest.

Figure 11D:
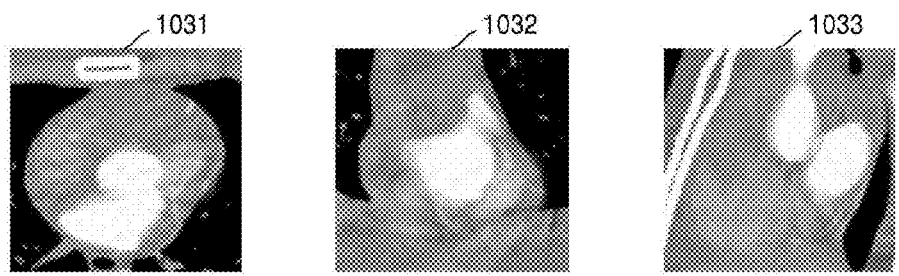
FIG. 11D illustrates first regions in the tomography images shown in FIG. 11C.

FIG. 11D illustrates enlarged images 1031, 1032, and 1033 of the first regions in the tomography images 1021, 1022, and 1023 shown in FIG. 11C.

Referring to FIG. 11D, in the tomography images 1031, 1032, and 1033 of the chest reconstructed according to the related art, blurring or motion artifacts introduced due to movement of the heart contracting and relaxing are observed to be greater than the enlarged images 1011, 1012, and 1013 of the first regions of the ground-truth tomography images 1001, 1002, and 1003 of the chest.

Figure 11E:
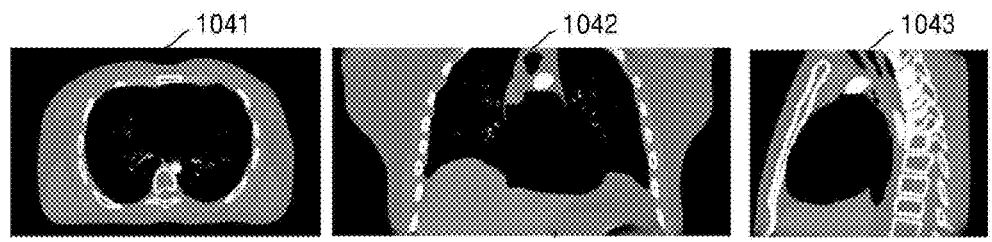
FIG. 11E show first images of a chest reconstructed according to an exemplary embodiment.

FIG. 11E show first images 1041, 1042, and 1043 of a chest reconstructed according to an exemplary embodiment.

As shown in FIG. 11E, the first images 1041, 1042, and 1043 are reconstructed based on second regions other than a first region including a moving object, i.e., the heart.

By comparing with the tomography images 1021, 1022, and 1023 of FIG. 11C reconstructed according to the related art, it can be seen that a second region excluding the heart, i.e., a region in which a relatively small amount of motion is detected, look clearer than the tomography images 1021, 1022, and 1023 reconstructed according to the related art. In other words, motion artifacts or blurring caused by a moving object may be further reduced in the first images 1041, 1042, and 1043, as compared to those in the tomography images 1021, 1022, and 1023.

Figure 11F:
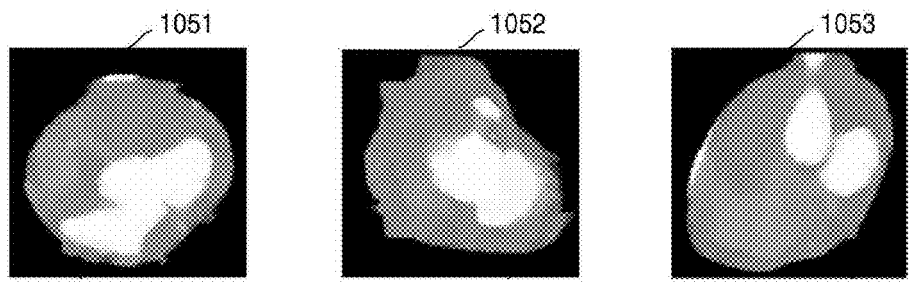
FIGS. 11F and 11G show second images of a chest reconstructed according to an exemplary embodiment.
Figure 11G:
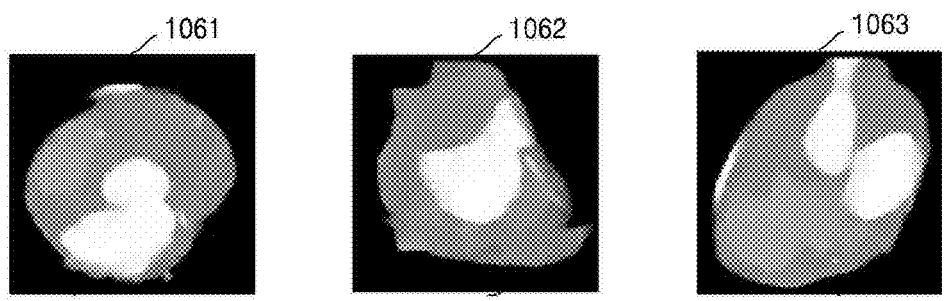

FIGS. 11F and 11G show second images 1051, 1052, and 1053 and 1061, 1062, and 1063 of a chest reconstructed us according to an exemplary embodiment.

As shown in FIGS. 11F and 11G, the second images 1051, 1052, and 1053 and 1061, 1062, and 1063 are reconstructed based on the first regions including a moving object, i.e., the heart. FIG. 11F shows tomography images (second images 1051, 1052, and 1053) of the heart at end-diastole, and FIG. 11G shows tomography images (second images 1061, 1062, and 1063) of the heart at end-systole.

By comparing with the enlarged images 1031, 1032, and 1033 of FIG. 11D of the first regions in the tomography images 1021, 1022, and 1023 reconstructed according to the related art, it can be seen that a first region including the heart, i.e., a region in which a relatively large amount of motion is detected, looks clearer than the enlarged images 1031, 1032, and 1033 of the first regions, which are reconstructed according to the related art. In other words, motion artifacts or blurring caused by a moving object may be further reduced in the second images 1051, 1052, and 1053 and 1061, 1062, and 1063, as compared to those in the enlarged images 1031, 1032, and 1033.

Figure 12:
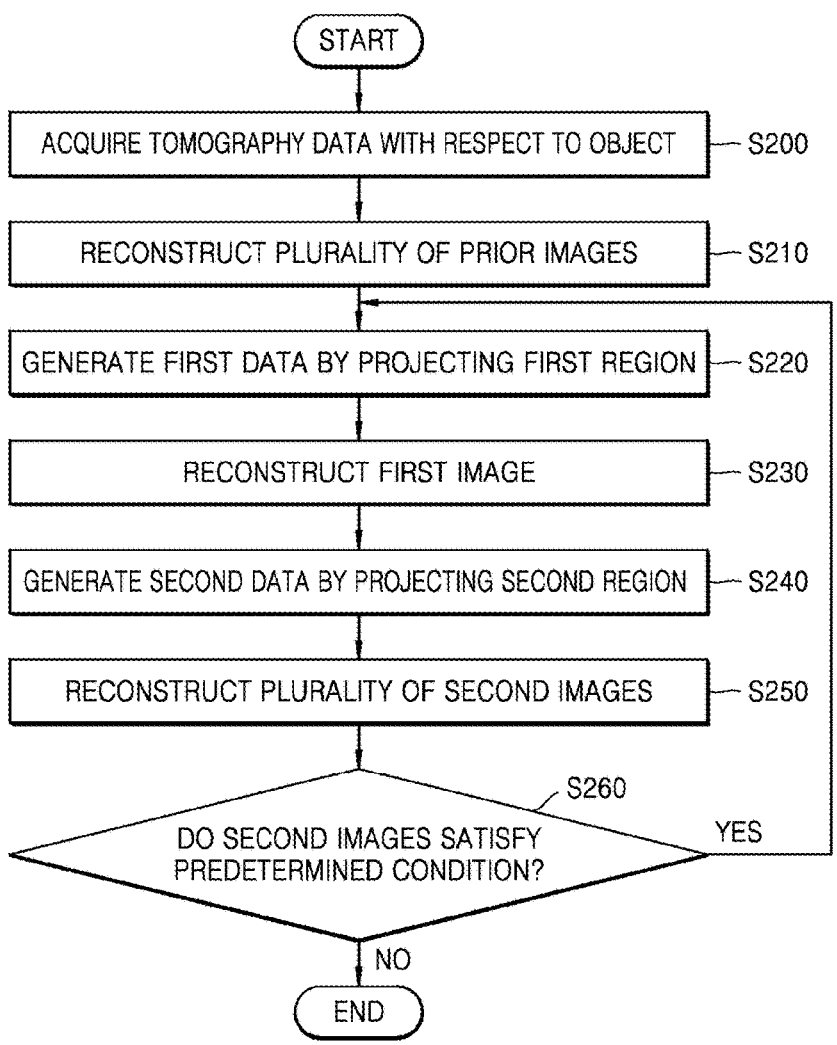
FIG. 12 is a flowchart of a method of reconstructing a tomography image, according to another exemplary embodiment.

FIG. 12 is a flowchart of a method of reconstructing a tomography image according to another exemplary embodiment.

Since steps S200, S210, S220, S230, S240, and S250 are substantially the same as their corresponding steps S100, S110, S120, S130, S140, and S150 described with reference to FIG. 10, descriptions that are already provided above with respect to FIG. 10 will be omitted below.

Referring to FIG. 12, the tomography apparatus 400 determines whether the plurality of second images reconstructed in step S250 satisfy a predetermined condition (S260).

According to an exemplary embodiment, the predetermined condition may be a condition in which subtraction between tomography data acquired in step S200 and the sum of first data generated by projecting a first region in step 220 and second data generated by projecting a second region in step S240 exceeds a certain range.

Here, a plurality of prior images are reconstructed based on tomography data, and each of the plurality of the prior images include first and second regions. Thus, as the sum of the first and second data respectively generated by projecting first and second regions becomes more similar to the tomography data, quality degradation due to motion artifacts or blurring may become less and less in the reconstructed second image.

When the reconstructed second images satisfy the predetermined condition in step S260, e.g., when subtraction between tomography data and the sum of the first and second data respectively generated by projecting first and second regions exceeds a certain range, the tomography apparatus 400 may determine the reconstructed second images as prior images and repeat the steps S220, S230, S240, and S250.

According to an exemplary embodiment, when subtraction between the sum of the first and second data generated by projecting first and second regions in the reconstructed second images and the tomography data acquired in step S200 exceeds a certain range, it may be determined that the reconstructed second images satisfy the predetermined condition.

The predetermined condition may also be a certain number of times reconstructions are performed. For example, reconstruction of a second image may continue until the number of reconstructions of the second image reaches a certain number of times.

As the second image is repeatedly reconstructed, motion artifacts or blurring may be reduced.

Furthermore, due to repeated reconstruction of the second image, the quality of a first image also may be improved.

Figure 13:
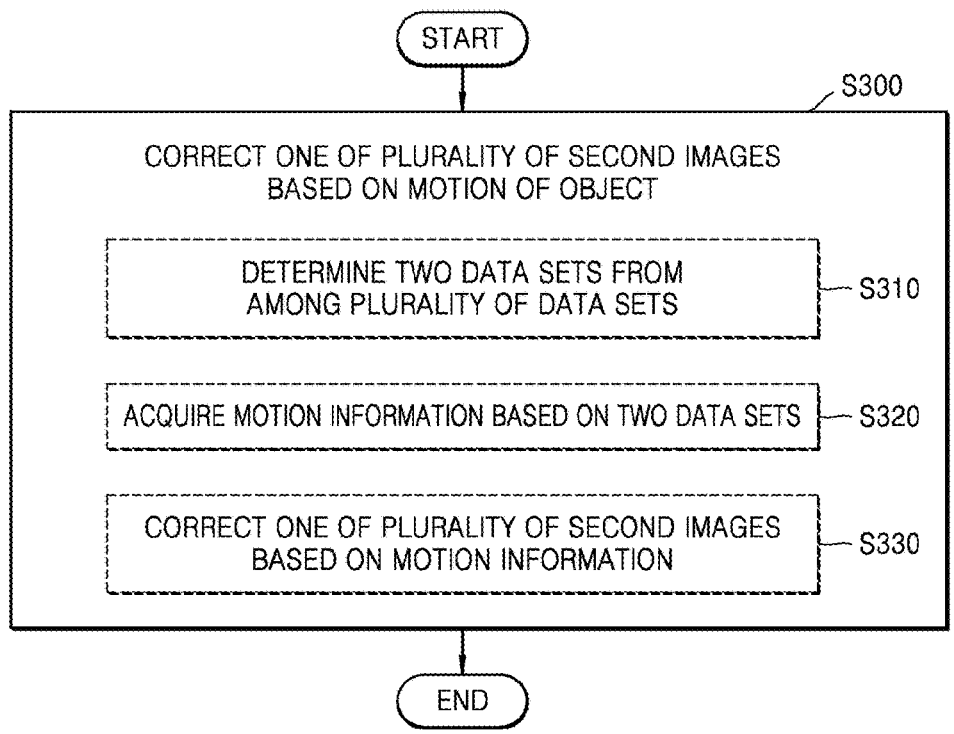
FIG. 13 is a flowchart of a method of correcting a tomography image, according to an exemplary embodiment.

FIG. 13 is a flowchart of a method of correcting a tomography image according to an exemplary embodiment.

The tomography apparatus 400 may correct at least one of a reconstructed plurality of second images based on motion of an object (S300). In detail, step S300 may include steps S310, S320, and S330.

As described above, a plurality of second images may be reconstructed based on a plurality of data sets that are respectively acquired at a plurality of time points based on second data. The data sets may be sinogram data.

In detail, the plurality of data sets respectively corresponding to a plurality of time points are extracted based on subtraction between tomography data and second data, and a plurality of second images may be reconstructed based on the extracted data sets.

The tomography apparatus 400 may determine two data sets from among a plurality of data sets (S310). In detail, the tomography apparatus 400 may determine, based on a predetermined criterion, the two data sets respectively corresponding to two time points from among the plurality of data sets respectively corresponding to a plurality of time points.

According to an exemplary embodiment, the predetermined criterion may be the amount of motion of an object. In detail, after calculating and comparing the amount of motion of the object in two data sets with each other, two data sets having a relatively small amount of motion of the object with respect to each other among the plurality of data sets may be determined.

Points representing the same part of the object in two data sets are compared with one another, and motion vectors representing differences between positions of the compared points and directions thereof may be calculated and used as the amount of motion of the object.

According to an exemplary embodiment, two data sets having the smallest amount of motion of the object among the plurality of data sets may be determined as the two data sets.

The tomography apparatus 400 may acquire motion information based on the two data sets determined in step S310 (S320).

For example, when two data sets having the smallest amount of motion of the object are determined from among the plurality of data sets, a size, a position, etc. of the object in the two data sets vary to the smallest extent. Thus, motion information acquired based on the two data sets may be considered to have the smallest error due to a moving object.

The tomography apparatus 400 may correct one of the plurality of second images based on the motion information acquired in step S320 (S330).

The plurality of data sets respectively correspond to a plurality of time points, and the two data sets determined in step S310 may correspond to two different time points from among the plurality of time points. According to an exemplary embodiment, the corrected one of the plurality of second images may be an image that is reconstructed based on a data set corresponding to a time point between the two different points corresponding to the two data sets determined in step S310.

As described above, two data sets having the smallest amount of motion of the object from among the plurality of data sets may be determined. Motion information acquired based on the determined two data sets may be considered to have the smallest error due to a moving object.

According to an exemplary embodiment, the tomography apparatus 400 may correct a second image corresponding to a time point between time points for the determined two data sets by using the acquired motion information. The tomography apparatus 400 may estimate a data set corresponding to a time point between the time points for the determined two data sets by using the two data sets and the acquired motion information, compare the estimated data set with an actual data set corresponding to the time point, and correct a second image corresponding to the time point. The tomography apparatus 400 may generate a second image based on the estimated data set corresponding to the time point, compare the generated second image with an actual second image corresponding to the time point, and correct the actual second image corresponding to the time point by using the motion information.

According to an exemplary embodiment, the tomography apparatus 400 may correct a second image corresponding to one of the determined two data sets by using acquired motion information. The tomography apparatus 400 may estimate one of the determined two data sets by using the two data sets and the acquired motion information, compare the estimated data set with an actual data set, and correct a second image corresponding to the actual data set.

According to an exemplary embodiment, the tomography apparatus 400 may correct a plurality of second images. For example, to correct the plurality of second images, the tomography apparatus 400 may determine two data sets from among a plurality of data sets to correct one second image and then may determine another two data sets from among the plurality of data sets to correct another second image other than the corrected second image. As another example, to correct the plurality of second images, the tomography apparatus 400 may determine two data sets from among a plurality of data sets to correct one second image, and then determine one data set from among the determined two data sets and another data set from among the plurality of data sets to correct another second image other than the corrected second image.

According to an exemplary embodiment, the tomography apparatus 400 may repeatedly correct one second image from among a plurality of second images. For example, to repeatedly correct one second image, the tomography apparatus 400 may determine two data sets from among a plurality of data sets to correct one second image and then determine one data set from among the determined two data sets and another data set from among the plurality of data sets to correct again the corrected second image In an implementation of the present disclosure, the exemplary embodiment where one second image is repeatedly corrected may be combined with the exemplary embodiment where a plurality of second images are corrected.

Figure 14A:
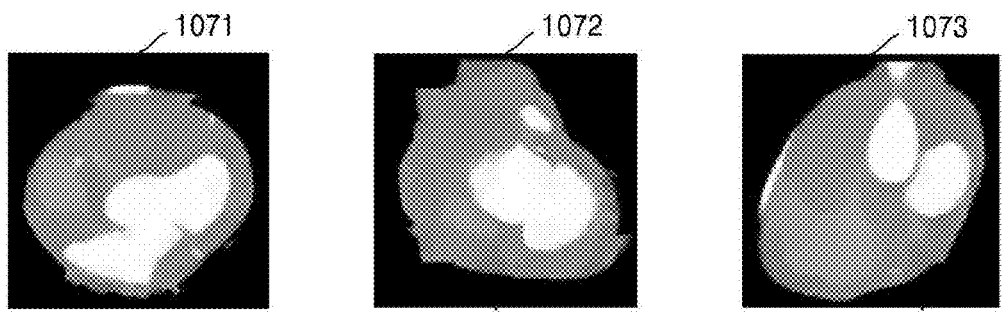
FIGS. 14A and 14B show second images of a chest corrected according to an exemplary embodiment.
Figure 14B:
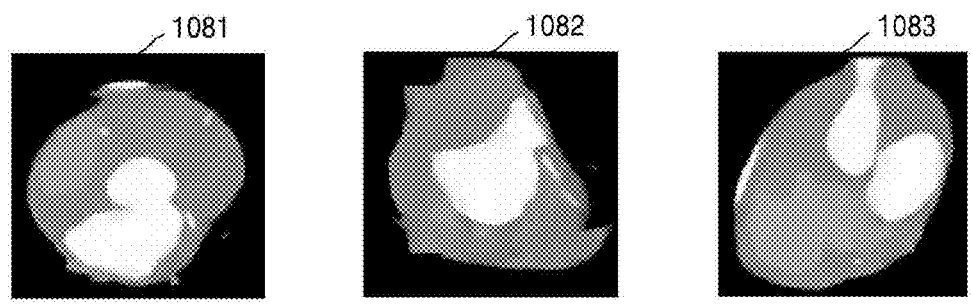

FIGS. 14A and 14B show second images of a chest corrected according to an exemplary embodiment.

As shown in FIGS. 14A and 14B, the second images 1071, 1072, and 1073 and 1081, 1082, and 1083 corrected according to an exemplary embodiment are images reconstructed based on first regions including a moving object, i.e., the heart. FIG. 14A shows tomography images (second images 1071, 1072, and 1073) of the heart at end-diastole, and FIG. 14B shows tomography images (second images 1081, 1082, and 1083) of the heart at end-systole.

By comparing with the enlarged images 1031, 1032, and 1033 of FIG. 11D of the first regions in the tomography images 1021, 1022, and 1023 reconstructed according to the related art, it can be seen that a first region including the heart, i.e., a region in which a relatively large amount of motion is detected, looks clearer than the enlarged images 1031, 1032, and 1033 reconstructed according to the related art. In other words, motion artifacts or blurring caused by a moving object may be further reduced in the second images 1071, 1072, and 1073 and 1081, 1082, and 1083, as compared to those in the enlarged images 1031, 1032, and 1033.

Figure 15:
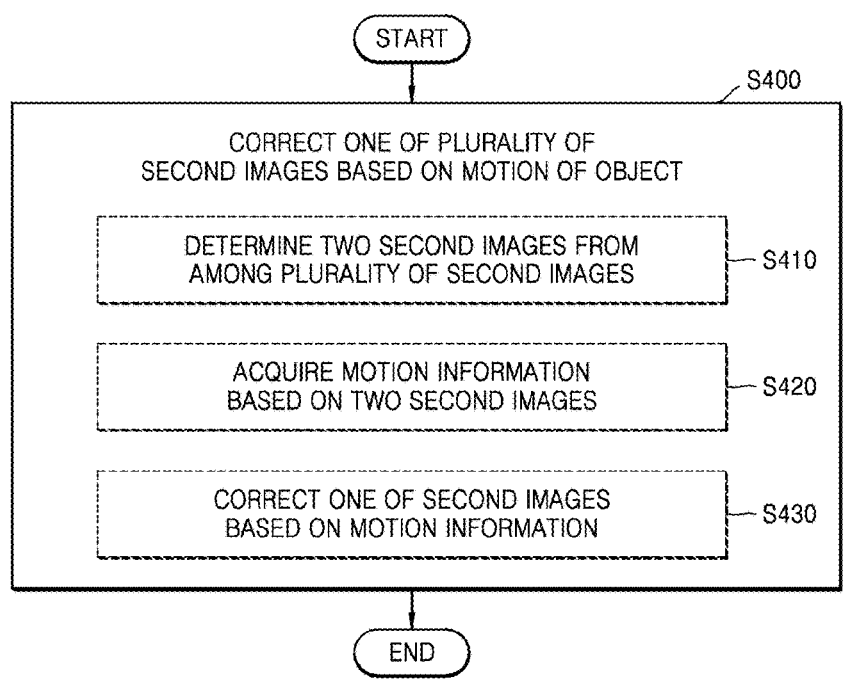
FIG. 15 is a flowchart of a method of correcting a tomography image, according to another exemplary embodiment.

FIG. 15 is a flowchart of a method of correcting a tomography image according to another exemplary embodiment.

The tomography apparatus 400 may correct at least one of a reconstructed plurality of second images based on motion of an object (S400). In detail, step S400 may include steps S410, S420, and S430.

The tomography apparatus 400 determines two second images from among the plurality of second images (S410). In detail, the tomography apparatus 400 may determine, based on a predetermined criterion, two second images respectively corresponding to two time points from among the plurality of second images respectively corresponding to a plurality of time points.

According to an exemplary embodiment, the predetermined criterion may be the amount of motion of an object. In detail, after calculating and comparing the amounts of motion of the object in second images with each other, two second images including a relatively small amount of motion of the object may be determined from among the plurality of second images.

Points representing the same part of the object in two second images are compared with one another, and motion vectors representing differences between positions of the compared points and directions thereof may be calculated and used as the amount of motion of the object.

According to an exemplary embodiment, two second images having the smallest amount of motion of the object among the plurality of second images may be determined as the two second images.

The tomography apparatus 400 may acquire motion information based on the two second images determined in step S410 (S420).

For example, when two second images having the smallest amount of motion of the object are determined from among the plurality of second images, a size, a position, etc. of the object in the two second images vary to the smallest extent. Thus, motion information acquired based on the two second images may be considered to have the smallest error due to a moving object.

The tomography apparatus 400 may correct one of the plurality of second images based on the motion information acquired in step S420 (S430).

The plurality of second images respectively correspond to a plurality of time points, and the two second images determined in step S410 may correspond to two different time points from among the plurality of time points. According to an exemplary embodiment, the corrected one of the plurality of second images may be a second image corresponding to a time point between the two different points corresponding to the two second images determined in step S410

As described above, two second images having the smallest amount of motion of the object among the plurality of second images may be determined. Motion information acquired based on the determined two second images may be considered to have the smallest error due to a moving object.

According to an exemplary embodiment, the tomography apparatus 400 may correct an image corresponding to a time point between time points for the determined two second images by using the acquired motion information. The tomography apparatus 400 may estimate and produce an image corresponding to a time point between the time points for the two second images by using the determined two second images and the acquired motion information, compare the estimated image with an actual image corresponding to the time point, and correct the actual image corresponding to the time point by using the motion information. The tomography apparatus 400 may generate a second image based on the estimated data set corresponding to the time point, compare the generated second image with an actual second image corresponding to the time point, and correct the actual second image corresponding to the time point by using the motion information.

The one of the plurality of second images may be one of the two second images determined in step S410. In other words, motion information is acquired based on the determined two second images, and a second image that is the closest to the acquired motion information may be corrected based on the motion information.

According to an exemplary embodiment, the tomography apparatus 400 may correct one of the determined two second images by using the acquired motion information. The tomography apparatus 400 may estimate one of the determined two second images by using the two second images and the acquired motion information, compare the estimated second image with its corresponding actual second image, and correct the actual second image.

According to an exemplary embodiment, the tomography apparatus 400 may correct a plurality of second images. For example, to correct the plurality of second images, the tomography apparatus 400 may determine two second images from among the plurality of second images to correct one second image based on the determined two second images, and then may determine another two second images from among the plurality of second images to correct another second image. As another example, to correct the plurality of second images, the tomography apparatus 400 may determine two second images from among the plurality of second images to correct one second image, and then determine one of the determined two second images and another one of the plurality of second images to correct a second image other than the corrected second image.

According to an exemplary embodiment, the tomography apparatus 400 may repeatedly correct one second image from among a plurality of second images. For example, to repeatedly correct one second image, the tomography apparatus 400 may determine two second images from among the plurality of second images to correct one second image and then determine one of the determined two second images and another one of the plurality of second images to correct again the corrected second image.

In an implementation of the present disclosure, the exemplary embodiment where one second image is repeatedly corrected may be combined with the exemplary embodiment where a plurality of second images are corrected.

Figure 16:
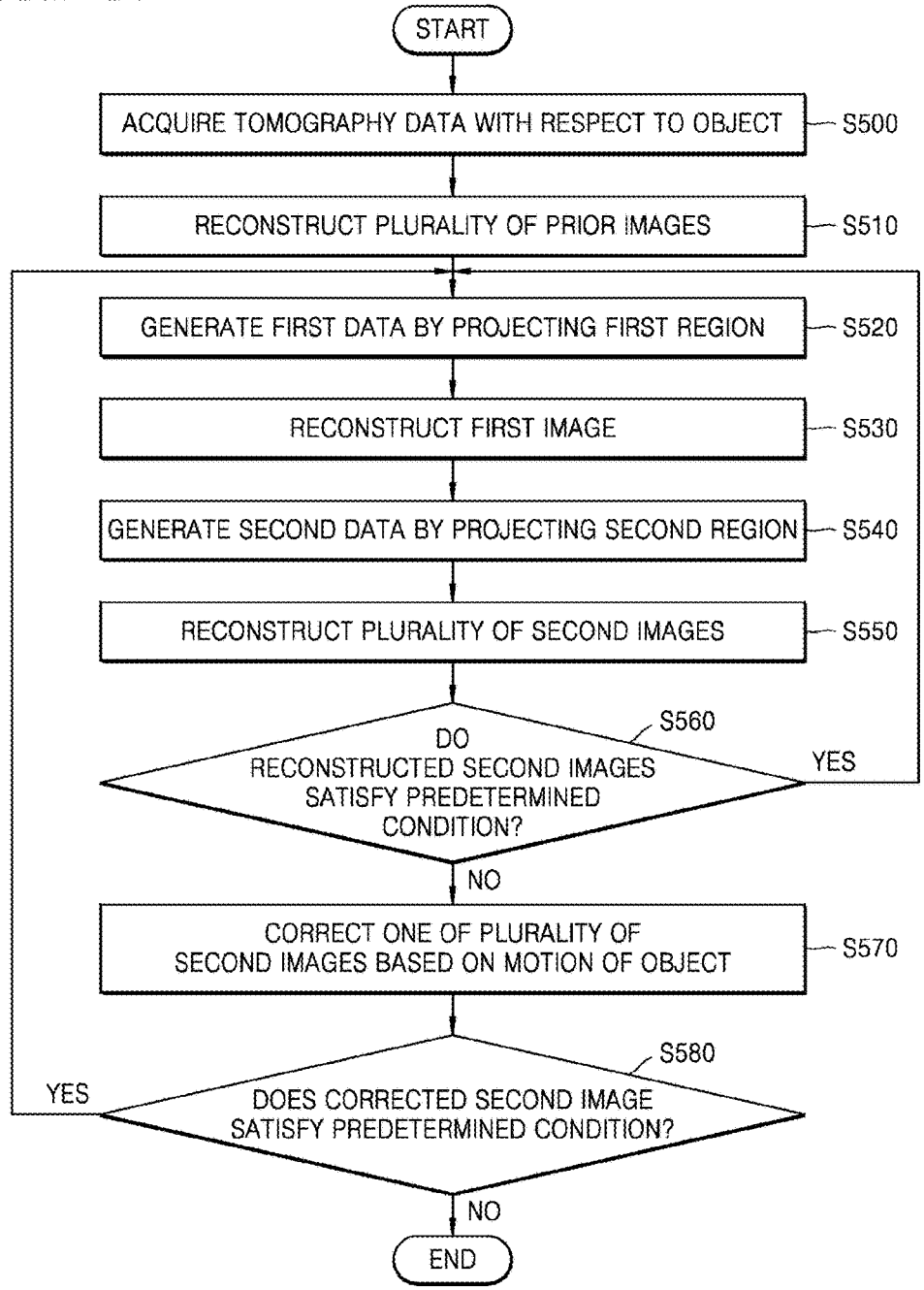
FIG. 16 is a flowchart of a method of correcting a tomography image, according to another exemplary embodiment.

FIG. 16 is a flowchart of a method of correcting a tomography image according to another exemplary embodiment.

Since steps S500, S510, S520, S530, S540, S550, and S560 are substantially the same as their corresponding steps S200, S210, S220, S230, S240, S250, and S260 described with reference to FIG. 12, descriptions that are already provided above with respect to FIG. 12 will be omitted below.

Furthermore, since step S570 is substantially the same as step S300 described with reference to FIG. 13 or step S400 described with reference to FIG. 15, descriptions that are already provided above with respect to FIG. 13 or 15 will be omitted below.

The tomography apparatus 400 may determine whether a second image corrected in step S570 satisfies a predetermined condition.

According to an exemplary embodiment, the predetermined condition may be a condition in which subtraction between tomography data acquired in step S500 and the sum of first data generated by projecting a first region in step S520 and second data generated by projecting a second region in step S540 exceeds a certain range.

When subtraction between the sum of the first and second data respectively generated by projecting first and second regions in a reconstructed plurality of second images and the tomography data acquired in step S500 exceeds a certain range, it may be determined that the reconstructed second images satisfy the predetermined condition in step S560.

When subtraction between the sum of first and second data respectively generated by projecting first and second regions in a corrected second image and the tomography data acquired in step S500 exceeds a certain range, it may be determined that the corrected second image satisfies the predetermined condition in step S580.

When the corrected second image satisfies the predetermined condition in step S580, e.g., when subtraction between tomography data and the sum of the first and second data respectively generated by projecting first and second regions in the corrected second image exceeds a certain range, the tomography apparatus 400 may determine the corrected second image as a prior image and repeat the steps described above.

By reconstructing again a first image based on the corrected second image and reconstructing again a second image based on the first image reconstructed again, it is possible to further reduce image quality degradation due to motion artifacts or blurring in reconstructed images. In other words, by reconstructing again a first image based on a second image whose quality degradation due to motion artifacts or blurring has been reduced via repeated reconstruction or correction, quality of the reconstructed first image may be improved. Furthermore, by reconstructing again a second image based on the reconstructed first image having a high quality, quality of the reconstructed second image may also be improved.

The predetermined condition may be a certain number of times corrections are performed. For example, a first image may be reconstructed using a corrected second image, a second image may be reconstructed using the reconstructed first image, and at least one of reconstructed second images may be corrected again until the number of corrections of a second image reaches a certain number of times.

According to an exemplary embodiment, if the corrected second image satisfies a predetermined condition, the tomography apparatus 400 may recorrect the corrected second image. Since the corrected second image is repeatedly corrected in substantially the same manner as described above, descriptions that are already provided above will be omitted below.

According to an exemplary embodiment, the number of reconstructions of a second image and the number of corrections of a reconstructed second image may be predetermined. In this case, the number of reconstructions and corrections of a second image may be determined according to a certain ratio. A reconstructed second image may be corrected via only step S570 illustrated in FIG. 16, or via all steps of S520, S530, S540, and S550.

The exemplary embodiments may be written as computer programs and may be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc.

While one or more exemplary embodiments have been described with reference to the figures, it will be understood by those of ordinary skill in the art that various changes in form and details may be made therein without departing from the spirit and scope of the disclosure as defined by the following claims. Accordingly, the above exemplary embodiments and all aspects thereof are examples only and are not limiting. It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of reconstructing a tomography image, the method comprising:
    acquiring tomography data corresponding to a moving object by performing a tomography scan of the moving object;
    reconstructing, based on the tomography data, a plurality of prior images of the moving object respectively corresponding to a plurality of time points;
    generating first data by projecting a region of each of the plurality of prior images;
    reconstructing a first image based on the tomography data and the first data;
    generating second data by projecting a region of the first image; and
    reconstructing, based on the tomography data and the second data, a plurality of second images respectively corresponding to the plurality of time points.

2. The method of claim 1, wherein the region of each of the plurality of prior images corresponds to a region where an amount of motion of the moving object is greater than a predetermined range.

3. The method of claim 1, wherein the first image is reconstructed using image subtraction between the tomography data and the first data.

4. The method of claim 1, wherein the region of the first image corresponds to a region where an amount of motion of the moving object is less than a predetermined range.

5. The method of claim 1, wherein the plurality of second images are reconstructed using image subtraction between the tomography data and the second data.

6. The method of claim 1, wherein motion artifacts caused by motion of the moving object are reduced in the plurality of second images, as compared to those in the plurality of prior images.

7. The method of claim 1, further comprising reconstructing at least one final image based on the first image and the plurality of second images.

8. The method of claim 1, further comprising:
    determining whether the plurality of second images satisfy a predetermined condition;
    generating, when the plurality of second images satisfy the predetermined condition, third data by projecting a region of each of the plurality of second images;
    reconstructing a third image based on the tomography data and the third data;
    generating fourth data by projecting a region of the third image; and
    reconstructing, based on the tomography data and the fourth data, a plurality of fourth images respectively corresponding to the plurality of time points.

9. The method of claim 8, wherein motion artifacts caused by motion of the moving object are reduced in the plurality of fourth images, as compared to those in the plurality of second images.

10. The method of claim 1, further comprising correcting at least one of the plurality of second images based on motion of the moving object.

11. The method of claim 10, wherein the plurality of second images are reconstructed based on a plurality of data sets that are respectively acquired at the plurality of time points based on the second data, and
    wherein the correcting the at least one of the plurality of second images comprises:
    determining, based on a predetermined criterion, two data sets respectively corresponding to two time points from among the plurality of data sets respectively corresponding to the plurality of time points;
    acquiring, based on the determined two data sets, motion information representing motion of the moving object; and
    correcting at least one of the plurality of second images based on the acquired motion information.

12. The method of claim 10, wherein the correcting the at least one of the plurality of second images comprises:
    determining, based on a predetermined criterion, two second images respectively corresponding to two time points from among the plurality of second images respectively corresponding to the plurality of time points;
    acquiring motion information representing motion of the moving object based on the determined two second images; and
    correcting at least one of the plurality of second images based on the acquired motion information.

13. The method of claim 11, wherein the corrected at least one of the plurality of second images corresponds to a time point between the two time points.

14. A tomography apparatus comprising:
    a data acquirer configured to acquire tomography data corresponding to a moving object by performing a tomography scan of the moving object; and
    an image reconstructor configured to:
    reconstruct, based on the tomography data, a plurality of prior images of the moving object respectively corresponding to a plurality of time points,
    generate first data by projecting a region of each of the plurality of prior images,
    reconstruct a first image based on the tomography data and the first data,
    generate second data by projecting a region of the first image, and
    reconstruct based on the tomography data and the second data, a plurality of second images respectively corresponding to the plurality of time points.

15. The tomography apparatus of claim 14, wherein the region of each of the plurality of prior images corresponds to a region where an amount of motion of the moving object is greater than a predetermined range.

16. The tomography apparatus of claim 14, wherein the first image is reconstructed using image subtraction between the tomography data and the first data.

17. The tomography apparatus of claim 14, wherein the region of the first image corresponds to a region where an amount of motion of the moving object is less than a predetermined range.

18. The tomography apparatus of claim 14, wherein the plurality of second images are reconstructed using image subtraction between the tomography data and the second data.

19. The tomography apparatus of claim 14, wherein motion artifacts caused by motion of the moving object are reduced in the plurality of second images, as compared to those in the plurality of prior images.

20. The tomography apparatus of claim 14, wherein the image reconstructor is further configured to reconstruct at least one final image based on the first image and the plurality of second images.

21. The tomography apparatus of claim 14, wherein the image reconstructor is further configured to:
   determine whether the plurality of second images satisfy a predetermined condition,
   generate, when the plurality of second images satisfy the predetermined condition, third data by projecting a region of each of the plurality of second images,
   reconstruct a third image based on the tomography data and the third data,
   generate fourth data by projecting a region of the third image, and
   reconstruct, based on the tomography data and the fourth data, a plurality of fourth images respectively corresponding to the plurality of time points.

22. The tomography apparatus of claim 21, wherein motion artifacts caused by motion of the moving object are reduced in the plurality of fourth images, as compared to those in the plurality of second images.

23. The tomography apparatus of claim 14, wherein the image reconstructor is further configured to correct at least one of the plurality of second images based on motion of the moving object.

24. The tomography apparatus of claim 23, wherein the plurality of second images are reconstructed based on a plurality of data sets that are respectively acquired at the plurality of time points based on the second data, and wherein the image reconstructor is further configured to:
   determine, based on a predetermined criterion, two data sets respectively corresponding to two time points from among the plurality of data sets respectively corresponding to the plurality of time points,
   acquire motion information representing motion of the moving object based on the determined two data sets, and
   correct at least one of the plurality of second images based on the acquired motion information.

25. The tomography apparatus of claim 23, wherein the image reconstructor is further configured to:
   determine, based on a predetermined criterion, two second images respectively corresponding to two time points from among the plurality of second images respectively corresponding to the plurality of time points,
   acquire motion information representing motion of the moving object based on the determined two second images, and
   correct at least one of the plurality of second images based on the acquired motion information.

26. The tomography apparatus of claim 24, wherein the corrected at least one of the plurality of second images corresponds to a time point between the two time points.

27. A non-transitory computer-readable recording medium having a computer program recorded thereon, which, when executed by a computer, performs the method of claim 1.

* * * * *